(12) United States Patent
McGuire, Jr.

(10) Patent No.: US 6,636,654 B2
(45) Date of Patent: Oct. 21, 2003

(54) PROGRAMMABLE OPTICAL SWITCHING ADD/DROP MULTIPLEXER

(75) Inventor: James P. McGuire, Jr., Pasadena, CA (US)

(73) Assignee: Optical Research Associates, Pasadena, CA (US)

( * ) Notice: Subject to any disclaimer, the term of this patent is extended or adjusted under 35 U.S.C. 154(b) by 0 days.

(21) Appl. No.: 09/955,741

(22) Filed: Sep. 18, 2001

(65) Prior Publication Data

US 2002/0196494 A1 Dec. 26, 2002

Related U.S. Application Data

(60) Provisional application No. 60/280,660, filed on Mar. 30, 2001.

(51) Int. Cl.[7] .............................. G02B 6/42; H04J 14/02
(52) U.S. Cl. .............................. 385/17; 385/18; 385/14; 385/24; 385/33; 385/31; 385/129; 385/130; 385/140; 359/115; 359/124; 359/127; 359/128
(58) Field of Search .................. 385/14, 24, 31, 385/33, 37, 42, 47, 88, 129, 140, 130, 131, 132, 17, 18; 359/115, 124, 130, 127, 128

(56) References Cited

U.S. PATENT DOCUMENTS

| | | | | |
|---|---|---|---|---|
| 4,244,045 A | * | 1/1981 | Nosu et al. | 359/129 |
| 4,482,994 A | * | 11/1984 | Ishikawa | 359/129 |
| 4,768,849 A | | 9/1988 | Hicks et al. | 350/96.15 |
| 5,652,814 A | | 7/1997 | Pan et al. | 385/24 |
| 5,786,915 A | * | 7/1998 | Scobey | 359/127 |
| 5,822,095 A | * | 10/1998 | Taga et al. | 359/127 |
| 5,859,717 A | | 1/1999 | Scobey et al. | 359/124 |
| 5,960,133 A | | 9/1999 | Tomlinson | 385/18 |
| 6,185,023 B1 | | 2/2001 | Mizrahi | 359/130 |
| 6,198,857 B1 | * | 3/2001 | Grasis et al. | 384/24 |
| 6,204,946 B1 | | 3/2001 | Aksyuk et al. | 359/131 |
| 6,320,996 B1 | * | 11/2001 | Scobey et al. | 359/128 |
| 2002/0196494 A1 | * | 12/2002 | McGuire, Jr. | |

FOREIGN PATENT DOCUMENTS

WO WO 02/079832 A1 10/2002

OTHER PUBLICATIONS

PCT International Search Report dated Aug. 28, 2002, received for International Appln. No. PCT/US02/09822.
Scobey et al., Hybrid thin film WDM and optical switch devices for optical add/drop, OCLI Telecommunications Division, 3 pp.

* cited by examiner

*Primary Examiner*—Brian Healy
(74) *Attorney, Agent, or Firm*—Christie, Parker & Hale, LLP

(57) ABSTRACT

A multi-channel optical switching system particularly usable as a programmable optical add/drop multiplexer (POADM) in a multi-wavelength communication system. The switching system uses a thin film optical demux/mux that separates a multi-channel optical signal into a plurality of optical channels, and combines a plurality of optical channels into a multi-channel optical signal. The system also uses a plurality of optical ports optically connected to the thin film optical demux/mux and a selecting device to select which optical channel is directed to which of the optical ports.

30 Claims, 12 Drawing Sheets

PROGRAMMABLE OPTICAL SWITCHING ADD/DROP MULTIPLEXER

RELATED APPLICATION

This application claims priority of U.S. Provisional Application No. 60/280,660 filed Mar. 30, 2001, the disclosure of which is incorporated fully herein by reference.

FIELD OF THE INVENTION

This invention relates to the field of optical communications, and more particularly, to a programmable optical add/drop system for use in optical multiplexing.

BACKGROUND OF THE INVENTION

For several decades, fiber optics have been used for communication. Specifically, fiber optics are used for data transmission and other telecommunication applications. Despite the enormous information carrying capacity of fiber, as compared to conventional copper cable, the high cost of installing fiber optics presents a barrier to full implementation of fiber optics, particular as the "last mile", from the central office to residences and businesses.

One method of increasing carrying capacity without incurring additional installation costs has been to multiplex multiple signals onto a single fiber using various methods, such as time division multiplexing, where two or more different signals are carried over the same fiber, each sharing a portion of time. Another, more preferred multiplexing method is wavelength division multiplexing (WDM), where two or more different wavelengths of light are simultaneously carried over a common fiber.

Until recently, typical fibers used for communications applications had preferred wavelength bands centered at 850 nm, 1300 nm, and 1550 nm, wherein each band typically had a useful bandwidth of approximately 10 to 40 nm depending on the application. Transmission within these bands was preferred by systems designers because of low optical attenuation. Recent advances in fiber design now provides fiber that have low attenuation over a very broad transmission range, from 1300–1620 nm.

Wavelength division multiplexing can separate a fiber's bandwidth into multiple channels. Dividing bandwidth into multiple discreet channels, such as 4, 8, 16, 40, or even as many as 160 channels, through a technique referred to as dense channel wavelength division multiplexing (DWDM), is a relatively lower cost method of substantially increasing telecommunication capacity, using existing fiber optic transmission lines. Techniques and devices are required, however, for multiplexing the different discreet carrier wavelengths. That is, the individual optical signals must be combined onto a common fiber-optic line or other optical waveguide and then later separated again into the individual signals or channels at the opposite end or other point along the fiber-optic cable. Thus, the ability to effectively combine and then separate individual wavelengths (or wavelength sub-ranges) from a broad spectral source is of growing importance to the fiber-optic telecommunications field and other fields employing optical instruments.

Optical multiplexers are known for use in spectroscopic analysis equipment and for the combination or separation of optical signals in wavelength division multiplexed fiber-optic telecommunications systems. Known devices for this purpose have employed, for example, diffraction gratings, prisms and various types of fixed or tunable filters.

Approaches for selectively removing or tapping a channel, i.e., selective wavelengths, from a main trunk line carrying multiple channels, i.e., carrying optical signals on a plurality of wavelengths or wavelength sub-ranges, is suggested, for example, in U.S. Pat. No. 4,768,849 to Hicks, Jr. Hicks, shows filter taps, as well as the use of gangs of individual filter taps, each employing high performance, multi-cavity dielectric pass-band filters and lenses for sequentially removing a series of wavelength sub-ranges or channels from a main trunk line. The filter tap of Hicks, returns a multi-channel signal to the main trunk line as it passes the desired channel to a branch line. One known demux is disclosed in Pan et al., U.S. Pat. No. 5,652,814, FIG. 25. In Pan et al., the WDM input signal is cascaded through individual filter assemblies, consisting of a fiber collamator, thin film filter, and a fiber focusing lens. Each filter is set for a given wavelength. However, aligning the fibers for each wavelength is costly and errors in the alignment contribute significantly to the system losses. Further, FIG. 13 of Pan et al. teaches the use of a dual fiber collimator, thin film filter, and a dual fiber focusing lens to selectively DROP and ADD a single wavelength or range of wavelengths. As discussed above, aligning the collimators is expensive. Other optical multiplexing devices eliminate many of the fiber to lens alignments.

In U.S. Pat. No. 4,244,045 to Nosu et al, for multiplexing or demultiplexing a multi-channel optical signal. A row of individual optical filters are glued side-by-side onto the surface of an optical substrate, and a second row is similarly glued to the opposite surface of the substrate. Each individual filter transmits a different channel, that is, a preselected wavelength(s), and reflects other wavelengths. A multi-channel optical beam from a trunk line enters the optical substrate at an angle and passes through the substrate from filter to filter in a zig-zag fashion. Each filter transmits its preselected wavelength(s) and reflects the remainder of the beam on to the next filter. Each filter element is sandwiched between glass plates, and a prism element is positioned between each filter sandwich and a corresponding collimator positioned behind the filter sandwich to receive the transmitted wavelength(s). Nosu et al teaches the use of refractive index matching. The lenses, filters, optical substrate, etc. all have the same refractive index and are in surface-to-surface contact with one another, such that the light beam does not pass through air. This approach by Nosu et al involves the use of prisms as an optical bridge between the filter element and the collimators at each channel outlet. This elaborate design approach adds considerable cost and assembly complexity to multiplexing devices of the type shown in Nosu et al. The approach of Scobey, et. al, in U.S. Pat. No. 5,859,717, is similar to Nosu et al., except the zig-zag pattern is through air, not glass. A single spacer block with a hole is used to mount the individual filter. The block is dense and stable with low sensitivity to changes in the temperature and ambient humidity. Xu, in U.S. Pat. No. 6,118,912, also uses a zig-zag pattern between filters in air, but Xu tilts the individual filters to adjust the center bandpass of each of the wavelengths. Thin film multiplexing devices are economical for low channel count systems and have a desirable flat-topped pass bands. Those skilled in the art will recognize that these multiplexing devices can also be employed in reverse to multiplex optical signals from individual channels onto a multi-channel optical signal.

Polarization dependent loss (PDL) is also a problem in WDM system because the polarization of the light drifts as it propagates through the fiber and furthermore this drift changes overtime. Thus, if there is PDL in any component, the drifting polarization will change the signal level, which may degraded the system operation.

Other multiplexer devices may be employed to add or drop channels in WDM systems. These systems are commonly known as optical add/drop multiplexers, or OADM. Another OADM, disclosed by Mizrahi U.S. Pat. No. 6,185,023, employs a fiber Bragg grating to a demux and mux signals in a WDM system. This method requires optical circulators and multiple components.

However, the multi channel OADM designs discussed above are not programmable by the end user. That is, each multiplexers is designed and manufactured to mux (add) specific channels by the factory; or when used in reverse each multiplexers is also designed and manufactured to demux (drop) specific channels by the factory. This limitation mandates that the optical system's parameters be fixed before installation. Changes are not possible without replacing the fixed optical multiplexers with different designed multiplexers. This is expensive.

One known programmable OADM is discussed in Boisset et al, International Publication No. WO01/13151. In Boisset et al., the desired add/drop channel is programmed by translating a segmented filter. To achieve this translation however, a large mechanical mechanism is employed. A further limitation to Boisset et al. is that only a single channel may be added or dropped per device. Designers may employ multiple devices, deployed in series, and programed as necessary to add/drop the correct channel, however this approach requires multiple devices and has multiple points of failure. Furthermore, the size of such a device would be overly large and therefore not practical for many applications where space is limited.

Two other programmable OADMs are disclosed by Tomlinson, U.S. Pat. No. 5,960,133, and Aksyuk, et al, U.S. Pat. No. 6,204,946, both use bulk optics and gratings to demultiplex and multiplex WDM input and output signal. The grating-based systems are large, inefficient and tend to have sharply peaked pass bands, rather then the desired flat-topped pass bands.

It is an object of the present invention to provide improved optical multiplexing devices which reduce or wholly overcome some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

SUMMARY OF THE INVENTION

In accordance with a first aspect of the invention, a programmable optical add/drop multiplexing device, programmed to add and/or drop one or more optical channels from/to a multi-channel light source, comprises four lenses, a first and second thin film demux/muxes, each in combination with a lens array, and programmable mirrors for directing light channels. The multi-channel light enters the device by way of a lens, and is directed through the first thin film demux/mux, where selected channels are filtered and directed through the first lens array and focused onto to the programmable mirrors. Depending upon the programmed state of the mirrors, the selected channels are either directed back through the first lens array and first thin film demux/mux and one of the lenses so as to enter a drop channel, or not reflected and allowed to pass through the second lens array and second thin film demux/mux and a lens so as to exit the device through a pass channel. In the instance where the programmed state of the mirrors directs one or more channels back through the first lens array and first thin film demux/mux and a lens so as to enter a drop channel, one or more add channels may enter the device by way of a lens, and is directed through the second thin film demux/mux and through the second lens array and focused onto to the programmable mirrors and is directed back through the second lens array and second thin film demux/mux and a lens so as to exit the device through the pass channel.

To reduce polarization dependent loss (PDL) in the system a quarter-wave plate (QWP) may also be employed between the first thin film demux/muxes and the first lens array and the second thin film demux/muxes and the second lens array.

In accordance with a second aspect of the invention, a programmable optical add/drop multiplexing device, programmed to add and/or drop one or more optical channels from/to a multi-channel light source, comprises a first and a second lens, a first and a second optical circulator, and a thin film demux/mux in combination with a lens array and programmable mirrors for directing light channels. The multi-channel light enters the device by way of the first optical circulator and the first lens, and is directed through the thin film demux/mux, where selected channels are filtered and directed to the lens array and focused onto the programmable mirrors. Depending on the programmed state of the mirrors, the selected channels are either directed back through the lens array and thin film demux/mux and the second lens and second optical circulator so as to enter a drop channel, or directed back through the lens array and thin film demux/mux and the first lens and the first optical circulator so as to exit the device through a pass channel. In the instance where the programmed state of the mirrors directs one or more channels back through the lens array and thin film demux/mux and the second lens and second optical circulator so as to enter a drop channel, one or more add channels may enter the device through the second optical circulator and second lens and be directed through the thin film demux/mux, where selected channels are filtered and directed to the lens array and focused onto the programmable mirrors, then back through the lens array and thin film demux/mux and the first circulator and first lens so as to exit the device through the pass channel.

To reduce polarization dependent loss (PDL) in the system a quarter-wave plate (QWP) may also be employed between the thin film demux/mux and the lens array. The largest source of PDL is the thin film filters. The reflectance for light polarized perpendicular and parallel to the plane of incidence (contains the incident, reflected, and transmitted rays) differ. A QWP is located such that it is substantially normal to the propagating light beam and the retardance axis is at 45° to the light that was polarized parallel and perpendicular to the plane of incidence throughout the thin film demux/mux. If light leaving the thin film array is polarized parallel to the plane of incidence, then the QWP converts the light to a right circular polarization state. As it propagates through the lens array and is still substantially right circularly polarized when it is incident on the programmable mirrors. Reflection from the programmable mirrors changes the handiness of the light, so light is substantially left circularly polarized as it enters the QWP the second time. Passage through the QWP converts the light back to a linearly polarized state, but it's departing polarization state is orthogonal to the input state. Likewise, if light leaving the thin film array was polarized perpendicular to the plane of incidence, it leaves parallel. Thus, during one pass through the filter the light is polarized parallel and on the next is polarized perpendicular leaving a substantially zero PDL for the system.

In accordance with a third aspect of the invention, a programmable optical add/drop multiplexing device, programmed to add and/or drop one or more optical channels from/to a multi-channel light source, comprises four lenses, and a thin film demux/mux in combination with a lens array and programmable mirrors for directing optical channels. The multi-channel collimated light enters the device by way of a collimator, and is directed through the thin film demux/mux, where selected channels are filtered and directed to the lens array and focused onto the programmable mirrors. Depending upon the programmed state of the mirrors, the selected channels are either directed back through the lens array and the thin film demux/mux and through a lens so as to enter a drop channel, or through a lens to exit the device through a pass channel. In the instance where the programmed state of the mirrors directs one or more channels back through the lens array and into thin film demux/mux and a lens so as to enter a drop channel, one or more channels may enter the device through a lens from one or more an add channels, and be directed through the thin film demux/mux, where selected channels are filtered and directed to the lens array and focused onto the programmable mirrors, and then back through the thin film demux/mux and a lens so as to exit the device through the pass channel.

To reduce polarization dependent loss (PDL) in the system a quarter-wave plate (QWP) may also be employed between the thin film demux/mux and the lens array.

In accordance with a fourth aspect of the invention, a programmable optical add/drop multiplexing device, programmed to add and/or drop four optical channels from/to a multi-channel collimated light source, comprises two or more lenses, and a thin film demux/mux comprised of at least two sides that demux and mux light sources, in combination with a first and second lens array and programmable mirrors for directing optical channels. The multi-channel collimated light enters the device by way of a lens, and is directed through the thin film demux/mux, where selected channels are filtered and directed to the first and second lens arrays and focused onto the programmable mirrors. Depending upon the programmed state of the mirrors, the selected channels are either directed back through the lens array and the thin film demux/mux and through a lens so as to enter a drop channel, or through a lens to exit the device through a pass channel. In the instance where the programmed state of the mirrors directs one or more channels back through the lens array and into thin film demux/mux and a lens so as to enter a drop channel, one or more channels may enter the device through a lens from one or more an add channels, and be directed through the thin film demux/mux, where selected channels are filtered and directed to the lens array and focused onto the programmable mirrors, and then back through the thin film demux/mux and a lens so as to exit the device through the pass channel.

To reduce polarization dependent loss (PDL) in the system a quarter-wave plate (QWP) may also be employed between the thin film demux/mux and the lens array.

DETAILED DESCRIPTION OF THE INVENTION

The programmable optical add/drop multiplexer of the invention has numerous applications, including for use in fiber optic telecommunications systems. For purposes of illustration, the preferred embodiments described below in detail multiplexing and demultiplexing, and adding and dropping channels, in wavelength division multiplexing and demultiplexing for a multi-channel fiber optic telecommunication systems. Exemplary references to an optical channel, or simply to a channel, should be understood to mean an optical signal with a centered wavelength and an upper and lower wavelength. Channel spacing is measured from the center of the first channel to the center of an adjacent channel.

Figure 1:
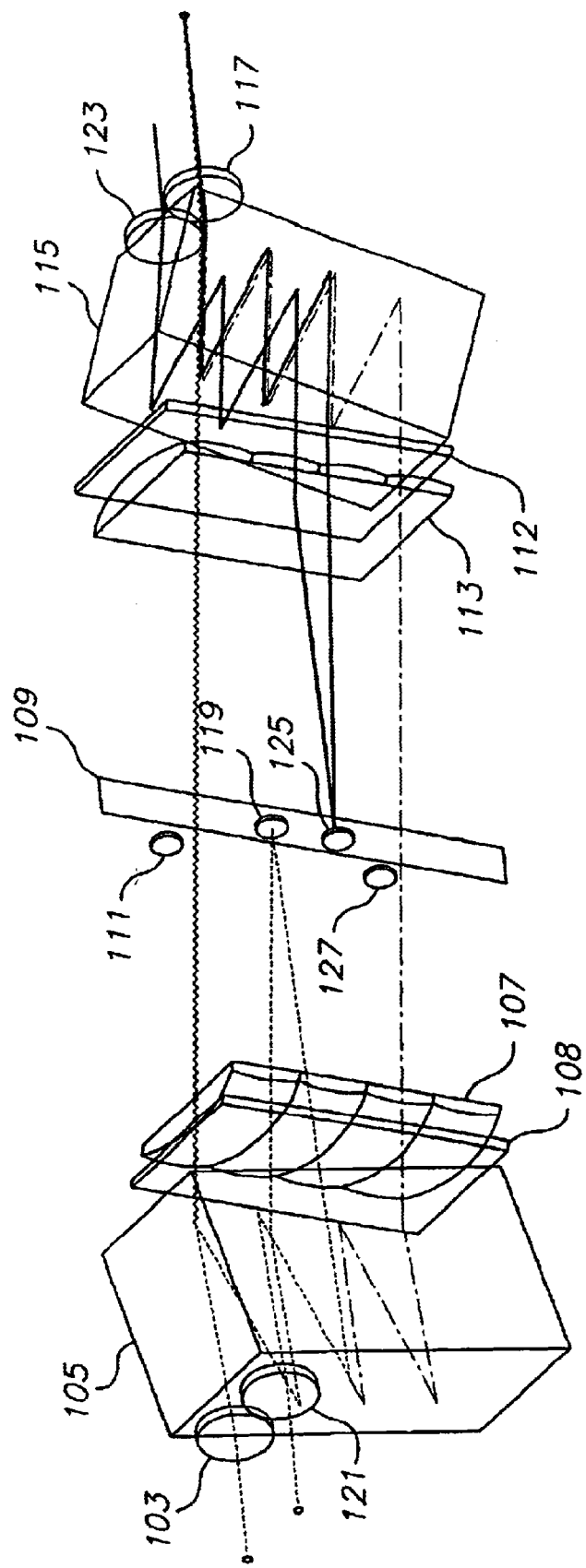
FIG. 1 is a perspective view of a first embodiment of a programmable optical add/drop multiplexer detailing the various channel paths through the device.

A four channel programmable optical add/drop multiplexer, employing one embodiment of the invention, is detailed in FIG. 1. It is of note that while only four channels are used in this example, a substantially larger number of channels/ports may be employed. The programmable optical add/drop multiplexer allows for demultiplexing and multiplexing four separate optical channels onto or off of a multi-channel light signal. The optical add/drop multiplexer of FIG. 1 may be dynamically programmed to demultiplex and multiplex any combination of channels onto or off the multi-channel light signal.

A first embodiment of the programmable optical add/drop multiplexing device of FIG. 1 comprises a first set of two lenses, IN collimator 103 and DROP lens 121, a first thin film demux/mux 105 and a first lens array 107, a second set of two lenses 123 and 117, a second thin film demux/mux 115, and a second lens array 113. All of these component are precisely aligned with each other, and mounted together so as to accommodate the entrance and exit of optical signals. The device of FIG. 1 may be mounted within an enclosure optimized for optical transmission, including a gas-filled enclosure, or the like.

In FIG. 1 a multi-channel light signal enters the device through the IN collimator 103, and is directed through first thin film demux/mux 105. The collimated light signal is directed inside the first thin film demux/mux 105 so as to enable each channel to separately exit the first thin film demux/mux 105 and be focused by first lens 107 onto a mirror array 109. Gaussian beam waists are located mid-way through the thin film demux/mux and at the center of each of the mirrors in the mirror array to minimize insertion losses.

The mirror array 109 contains a double-sided channel mirror for one or more of the channels; the first channel exits the first thin film demux/mux 105 and is focused onto channel mirror 111, the second channel is focused onto channel mirror 119, the third channel is focused onto channel mirror 125, and the fourth channel is focused onto channel mirror 127. For each channel, the lens array element relays the beam waist formed by the collimators in the middle of the demux/mux onto the channel mirror. Since the distance between the collimator waist and the lens array elements differs for each channel depending on the zig-zag path through the demux/mux, each lens array element optimally has a different radius of curvature and conic constant. To center the waists on each of the channel mirrors different wedges for each of the two sub-apertures used by the IN, DROP, ADD, and PASS beams are employed and different wedges for each channel are also employed. The radius, conic, and wedges can be easily designed using commercially available lens design software. This process is discussed in further detail below. It will be understood that devices may be employed where the mirror array 109 is constructed without channel mirrors for one or more particular channels.

It will be understood by those familiar with the art that the centered wavelength of each channel need not be demuxed or muxed beginning with the highest centered or lowest centered, nor need the channels be arranged in order of their wavelength. In fact, it will be further understood by those familiar with the art that wavelengths may be demuxed or muxed in any order.

Channel mirror 119 is engaged to reflect its corresponding channel back through the first lens array 107 and first thin film demux/mux 105 and through the DROP lens 121 so as to enter a DROP channel. In this regard, any channel mirror may be programmed to demultiplex its corresponding channel from the multi-channel light signal so as to allow the corresponding channel to exit the device through the DROP channel.

On the other hand, channel mirror 111 is programmed not to DROP its corresponding channel, instead allowing the channel to pass through to the second lens array 113 and the second thin film demux/mux 115 and be multiplexed onto the multi-channel light signal, exiting the device through the PASS lens 117.

In the instance where one or more of the channel mirrors is engaged and DROPs its corresponding channel, one or more channels may enter the device through the ADD collimator 123 and be directed inside the second thin film demux/mux 115 so as to enable each channel to separately exit the second thin film demux/mux 115 and be focused by a second lens 113 onto the corresponding engaged channel mirror located on the mirror array 109. The corresponding engaged channel mirror will reflect the ADDed channel back through the second lens array 113 and the second thin film demux/mux 115, multiplexing the channel onto the multi-channel light signal exiting the device through the PASS channel.

In this embodiment, the mirror array 109 is constructed using Micro Electrical Mechanical Systems (MEMS) pop-up mirrors that fully retract, or fully extend, into position. Programming of the channel mirrors is achieved by applying an electrical voltage to mechanical actuators. A larger mirror may be employed by design to control more then one channel. Of course, other types of mirror actuators could be used.

By engaging the channel mirrors, one or more separate optical channels may be dynamically routed onto or off of a multi-channel light signal. Further, by engaging the channel mirrors as a function of time and in synchronous conjunction with other system components, time-division multiplexing of optical signals may be achieved.

The first thin film demux/mux 105 and second thin film demux/mux 115 are typically identical to each other and sized according to the number of channels supported by the device.

A first quarter-wave plate (QWP) 108 and a second QWP 112 reduce polarization dependent loss (PDL) in the system. QWP 108 and QWP 112 are located such that they are substantially normal to the propagating light beam and the retardance axis is at 45° to the light that was polarized parallel and perpendicular to the plane of incidence throughout the demux.

In the event the channel mirrors 111, 119, 125, and 127 are not engaged light passes thru the second lens array 113 and the second quarter-wave plate (QWP) 112. The second quarter-wave plate (QWP) 112 axis is at 90 degrees to the axis of the first quarter-wave plate (QWP) 108. As the light propagates through the lens array 107 and enters the second QWP 112 it is still substantially right circularly polarized. Passage through the second QWP 112 converts the light back to a linearly polarized state, but it's departing polarization state is orthogonal to the input state. Thus, during one pass through the system the light is parrallel and on the next is perpendicular leaving a substantially zero PDL for the system.

Figure 2:
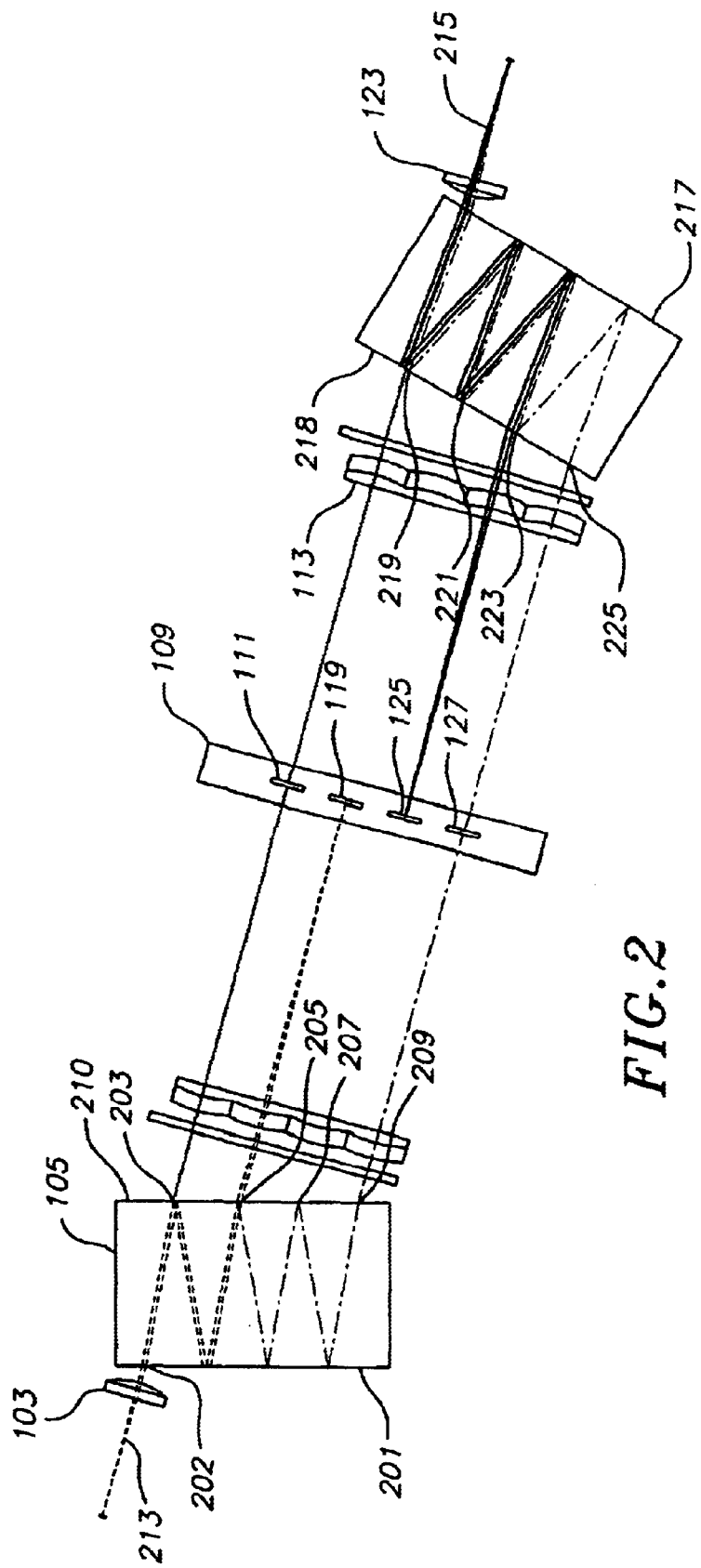
FIG. 2 is a schematic plan view illustration of the embodiment of FIG. 1, detailing the various channel paths through the device.

Turning next to FIG. 2, the path of a four channel multi-channel collimated light signal 213 is more clearly illustrated. More specifically, of the four separate channels, the first and fourth channels are PASSED through the device, the second channel is DROPPED from the device, and the third is ADDED. Each of the four channel's path's are described below.

The first channel is PASSED through the device as follows. The multi-channel light signal 213 enters the device through the IN collimator 103 and is directed into a first surface 201 of the first thin film demux/mux 105 through an entry port 202 and to a thin film filter 203 located on the second surface 210 of the first thin film demux/mux 105. The entry port 202 is transparent to all wavelengths contained within the multi-channel collimated light signal 213 and allows all channels to enter the thin film demux/mux 105. Thin film filter 203 is transparent to a first sub-range of wavelengths 211 that corresponds with the first channel included in the multi-channel collimated light signal 213. Hereafter this first sub-range of wavelengths is referred to as the first channel 211. Specifically, channel 211 passes through thin film filter 203, demultiplexing the channel from the multi-channel collimated light signal 213, whereas other channels contained within the multi-channel collimated light signal are reflected back into the first thin film demux/mux 105. The first channel 211 is directed through the first lens array 109 where it is focused onto the channel mirror 111 that corresponds with this channel.

Channel mirror 111 is not engaged. Accordingly, the first channel 211 is directed through the second lens array 113 and focused onto the second thin film demux/mux 115. The first channel enters the second surface 218 of the second thin film demux/mux 115 through a thin film filter 219 and is multiplexed onto the multi-channel collimated light signal and exits the device through the PASS lens of FIG. 1, 117 (not shown on FIG. 2). Thin film filter 219 is transparent to the first sub-range of wavelengths 211 that corresponds with the first channel included in the multi-channel collimated light signal 213.

The fourth channel is PASSED through the devices as follows. The multi-channel light signal 213 enters the device through the IN collimator 103 and is directed into the first surface 201 of the first thin film demux/mux 105 to the thin film filter 203 located on the second surface 210 of the first thin film demux/mux 105. Thin film filter 203 is transparent to a first sub-range of wavelengths 211 that corresponds with the first channel, all other channels contained within the multi-channel collimated light signal are reflected back into the first thin film demux/mux 105. The multi-channel collimated light signal 213, now comprised of channels two through four, reflects off the first surface 201 and encounters thin film 205, which filters out channel two. The multi-channel collimated light signal 213, now comprised of channels three and four, reflects off the first surface 201 and encounters thin film 207, which filters out channel three. Lastly, the multi-channel collimated light signal 213, now comprised only of channel four, reflects off the first surface 201 and encounters thin film 209, which allows channel four to pass through to be focused by lens array 107 onto the mirror array 109. Because channel mirror 127 is not engaged, channel four is directed through the second lens array 113 and focused onto the second thin film demux/mux 115. Channel four enters the second surface 218 of the second thin film demux/mux 115 through a thin film filter 225 and is multiplexed onto the multi-channel collimated light signal. Thin film filter 225 is optically similar to thin film filter 209 in that it allows channel four to pass, and reflects all other channels.

The multi-channel collimated light signal is then reflected by the first surface 217 of the thin film demux/mux 115 to thin film filter 223. Thin film filter 223 allows channel three to pass, multiplexing channel three onto the multi-channel collimated light signal. The multi-channel collimated light signal, now channels three and four, is reflected by the first surface 217 to thin film filter 221, multiplexing channel, then again by the first surface 217 to thin film 221, picking up channel one. Lastly, the multi-channel collimated light signal, now channels four-one, exits the device through the PASS lens FIG. 1, 117 (not shown on FIG. 2).

The second channel 227 is DROPPED from the device as follows: The multi-channel light signal 213 enters the device through the IN collimator 103 and is directed into the first surface 201 of the first thin film demux/mux 105 to a thin film filter 203 located on the second surface 210 of the first thin film demux/mux 105. Thin film filter 203 is transparent to a first sub-range of wavelengths 211 that corresponds with the first channel 211 included in the multi-channel collimated light signal 213. The multi-channel collimated light signal 213 is reflected off the second surface 210 and again of the first surface 201 to a thin film filter 205 located on the second surface 210. Thin film filter 205 is transparent to a second sub-range of wavelengths 227 that corresponds with the second channel 227 included in the multi-channel collimated light signal 213. Specifically, channel 227 passes through thin film filter 205, demultiplexing the channel from the multi-channel collimated light signal 213. The second channel 227 is directed through the first lens array 109 where it is focused onto the channel mirror 119 that corresponds with this channel.

Because channel mirror 119 is engaged, the second channel 227 is reflected off the channel mirror back through the first lens array 107 and focused onto the first thin film demux/mux 105. The second channel 227 enters the second surface 210 of the first thin film demux/mux 105 through thin film filter 205, and is reflected by first surface 201 and second surface 210 to the DROP lens FIG. 1, 121 (not shown on FIG. 2), so as to exit the device through the DROP channel.

A new channel three 215 may be ADDED as follows: In the instance where channel mirror 125 is engaged and DROPs channel three contained within multi-channel collimated light signal 213, a new channel three 215 may be ADDED to the multi-channel collimated light signal exiting the devices FIG. 1, 117 (not shown). A new channel three 215 is directed into the first surface 217 of the second thin film demux/mux 115 by collimator 123. The new channel three 215 is reflected off the second surface 218, because thin film filter 219 is only transparent to channel one, back to the first surface 217. The new channel three 215 is again reflected off the first surface 217 and then reflected off the second surface 218, because thin film filter 221 is only transparent to channel two. The new channel three 215 is again reflected off the first surface 217 and then passes through thin film filter 223, which is transparent to channel three, exiting the second thin film demux/mux 115. The new channel three 215 is directed through the second lens array 113 and focused onto channel mirror 125, which is engaged and reflects the new channel three 215 back through the second lens array 113 and into the second thin film demux/mux 115. Thin film filter 223 allows channel three to pass, multiplexing channel three onto the multi-channel collimated light signal. The multi-channel collimated light signal, now channels three and four, is reflected by the first surface 217 to thin film filter 221, multiplexing channel, then again by the first surface 217 to thin film 221, picking up channel one. Lastly, the multi-channel collimated light signal, now channels four-one, exits the device through the PASS lens FIG. 1, 117 (not shown on FIG. 2).

A programming table for the four channel programmed optical add/drop multiplexer functioning as described in the first embodiment is provide in table 1.

TABLE 1

| CHANNEL | MODE | MIRROR STATE |
| --- | --- | --- |
| One | PASS | Disengaged |
| Two | DROP | Engaged |
| Three | ADD | Engaged |
| Four | PASS | Disengaged |

A second embodiment of the invention is detailed in FIG. 3, again by way of a four channel programmable optical add/drop multiplexer. The optical add/drop multiplexer of FIG. 3 may be dynamically programmed to demultiplex and multiplex any combination of channels onto or off the multi-channel collimated light signal. Optical add/drop multiplexer of FIG. 3 employs optical circulators as a bi-directional optical path to achieve various objects of the invention. An optical prescription for an eight channel programmable optical add/drop multiplexer with an airspace thin film filter optical demux and a silica lens array for the second embodiment is provided in Table 2.

TABLE 2

This embodiment is intended to operate at wavelengths near 1550 nm with input fibers that support a single mode that is 10.4 microns in diameter and with a MEMS mirror that tilts +/− 0.8 deg.
COLLIMATOR
Material: SF57
Radius: −2.957
Conic: −0.651
Thickness: 1.000
The collimator array has an aspheric surface described by the following equation $z = curv*y^2/(1 + sqrt(1 - (1 + k)curv^2 y^2)$
wherin x and y are measured from the center of each lenslet,
curv =1/radius, and k = conic.
DEMUX/MUX BLOCK
Material: AIR
Size
Block: 2.551 × 15.317 × 12.000
Filter: 2.551 × 1.051
Tilt: 2.800 deg
LENS ARRAY
Material: SILICA
Lenslet aperture size: 3.000 × 1.498
Array size: 3.000 × 11.986
Substrate thickness: 2.000
Right Hand Side

|         |        | Pyramid (mrad) |        |        | Maximum     |
| ------- | ------ | -------------- | ------ | ------ | ----------- |
| Channel | Radius | Conic          | X-tilt | Y-tilt | Lenslet Sag |
| 1       | 12.933 | −0.552         | 4.887  | 0.000  | 0.116       |
| 2       | 12.796 | −0.558         | 4.267  | 0.000  | 0.116       |
| 3       | 12.571 | −0.567         | 3.214  | 0.000  | 0.117       |
| 4       | 12.270 | −0.578         | 1.751  | 0.000  | 0.117       |
| 5       | 11.942 | −0.589         | 0.068  | 0.000  | 0.118       |
| 6       | 11.645 | −0.598         | −1.537 | 0.000  | 0.119       |
| 7       | 11.418 | −0.605         | −2.821 | 0.000  | 0.119       |
| 8       | 11.268 | −0.610         | −3.693 | 0.000  | 0.119       |

The lenslets array has an aspheric surface described by the following equation
$z = curv*y^2/(1 + sqrt(1 - (1 + k)curv^2 y^2) + xt*abs(x) + yt*abs(y)$
wherin x and y are measured from the center of each lenslet,
curv = 1/radius, k = conic, and xt = x-tilt and yt = y-tilt
of the pyramid term.
All linear dimensions are in millimeters.

Figure 3:
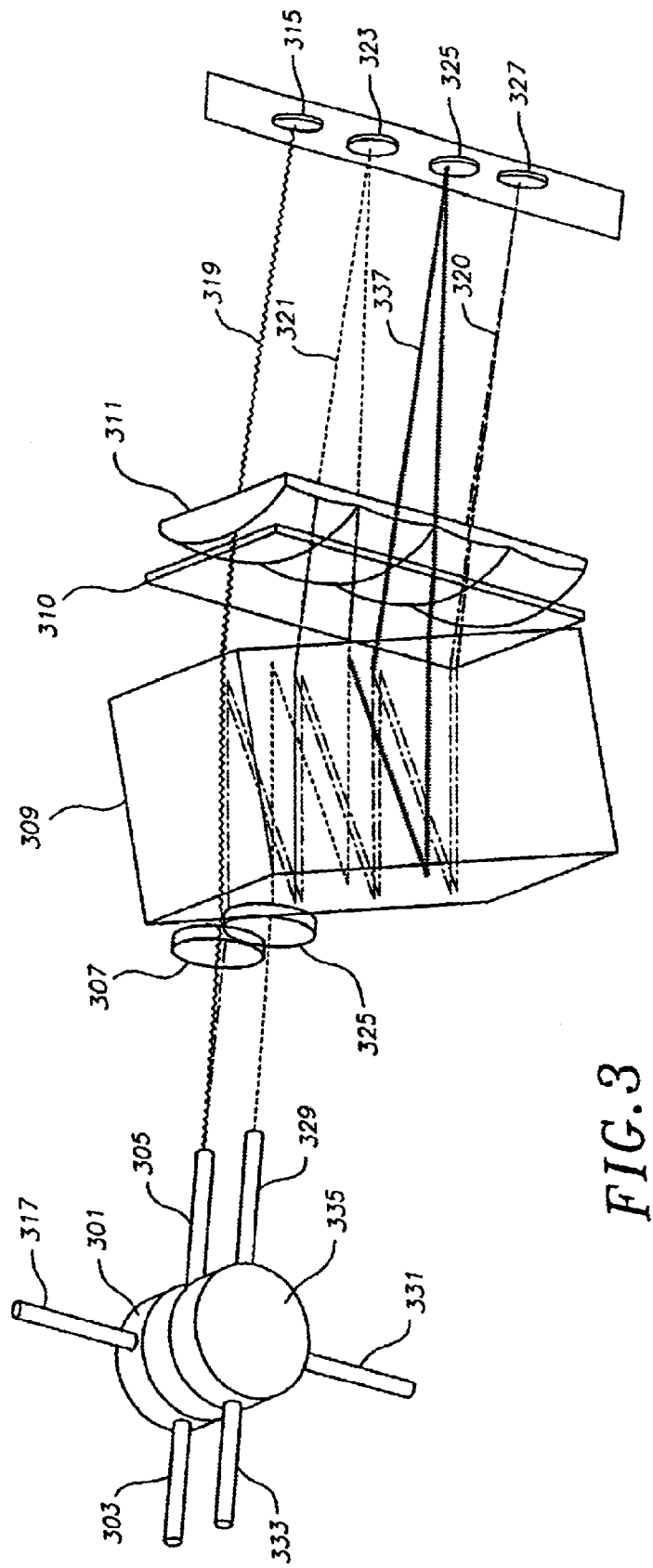
FIG. 3 is a perspective view of a second embodiment of a programmable optical add/drop multiplexer detailing the various channel paths through the device.

The programmable optical add/drop multiplexing device of FIG. 3 comprises a first and a second circulator 301 and 335, a first and a second lens 307 and 325, a thin film demux/mux 309, a first lens array 311, and a mirror array 313. All of these components are precisely aligned with each other, and mounted together so as to accommodate the entrance and exit of optical signals. Often, the device of FIG. 3 may be mounted within an enclosure optimize for optical transmission, including a gas-filled inclosure, or the like.

In FIG. 3 a multi-channel light signal enters the device through the IN port 303 on the first circulator 301 and is passed via the Bi-directional port 305 of circulator 301 to the first collimator 307, and directed into the thin film demux/mux 309 so as to enable each channel to separately exit the thin film demux/mux 309 and be focused by the lens array 311 onto the mirror array 313. Gaussian beam waists are located mid-way through the thin film. Thin film filter demux/mux 309 contains four thin films located on the surface of the thin film demux/mux 309, each filter is transparent to a sub-range of wavelengths contained in the multi-channel collimated light signal.

The mirror array 313 contains four one-sided see-saw channel mirrors, one for each of the four channels of the device; the first channel exits the thin film demux/mux 309 and is focused onto channel mirror 315, the second channel is focused onto channel mirror 323, the third channel is focused onto channel mirror 325, and the fourth channel is focused onto channel mirror 327. For each channel, the lens array element relays the beam waist formed by the collimators in the middle of the demux/mux onto the channel mirror. Since the distance between the collimator waist and the lens array elements differs for each channel depending on the zig-zag path through the demux/mux, each lens array element optimally has a different radius of curvature and conic constant. To center the waists on each of the channel mirrors different wedges for each of the two sub-apertures used by the IN, DROP, ADD, and PASS beams are employed and different wedges for each channel are also employed. The radius, conic, and wedges can be easily designed using commercially available lens design software.

It will be understood by those familiar with the art that the centered wavelength of each channel need not be demuxed or muxed beginning with the highest centered or lowest centered, nor need the channels be arranged in order of their wavelength. In fact, it will be further understood by those familiar with the art that wavelengths may be demuxed or muxed in any order.

As in the previous example which detailed a four channel device, here the first and fourth channels are PASSED through the device, the second channel is DROPPED from the device, and the third channel is ADDED. Each of the four channel's path's are detailed below.

Channel one 319 is PASSED through the devices as follows. The multi-channel light signal enters the device through the IN port 303 of the first circulator 301 and first collimator 307 and is directed into the thin film demux/mux 309. Channel one 319 passes through the thin film filter corresponding to its wavelength, demultiplexing the channel from the multi-channel collimated light signal and then directed through the lens array 311 and focused onto channel mirror 315.

Channel mirror 315 is in PASS mode, accordingly, channel one 319 is reflected off the channel mirror back through the lens array 311 and focused onto the thin film demux/mux 309. Channel one 319 enters the thin film demux/mux 309 and is muxed onto the multi-channel collimated light signal. Next, the multi-channel collimated light signal enters the first collimator 307 and the bi-directional port 305 of the first circulator 301 and exits the device through the PASS port 317 of the first circulator 301.

Channel four 320 is PASSED in identical fashion to channel one 319, except that the channel four 320 passes through the thin film filter corresponding to its wavelength and is reflected back by channel mirror 327.

Channel two 321 is DROPPED from the device as follows: The multi-channel light signal enters the device through the IN port 303 of the first circulator 301 and first collimator 307 and is directed into the thin film demux/mux 309. Channel two 321 passes through the thin film filter corresponding to its wavelength, demultiplexing the channel from the multi-channel collimated light signal and then is directed through the lens array 311 where it is focused onto channel mirror 323.

Channel mirror 323 is programmed to DROP/ADD the channel, and accordingly, channel two 321 is reflected off channel mirror 323 back through the lens array 311 and focused onto the thin film demux/mux 309, then enters the second lens 323 and bi-directional port 329 of the second circulator 335 and exits the device through the DROP port 331 of the second circulator 335.

A new channel three 337 may be ADDED as follows: In the instance where channel mirror 325 is engaged and DROPs the channel three contained within the multi-channel collimated light signal, a new channel three 337 may be ADDED to the multi-channel light signal exiting the device. New channel three 337 enters the device through the ADD port 333 of the second circulator 335 and second collimator 325 and is directed into the thin film demux/mux 309. The new channel three 337 passes through the thin film filter corresponding to its wavelength and is directed through the lens array 311 where it is focused onto channel mirror 325.

Channel mirror 325 is in DROP/ADD mode, and accordingly, channel three 337 is reflected off the channel mirror back through the lens array 311 and focused onto the thin film demux/mux 309. Channel three 325 enters the thin film demux/mux 309 and is muxed into the multi-channel collimated light signal. Next, the multi-channel collimated light signal enters the first collimator 307 and the bi-directional port 305 of the first circulator 301 and exits the device through the PASS port 317 of the first circulator 305.

The quarter-wave plate (QWP) 310 reduces polarization dependent loss (PDL) in the system. QWP 310 is located such that it is substantially normal to the propagating light beam and the retardance axis is at 45° to the light that was polarized parallel and perpendicular to the plane of incidence throughout the demux.

Figure 4:
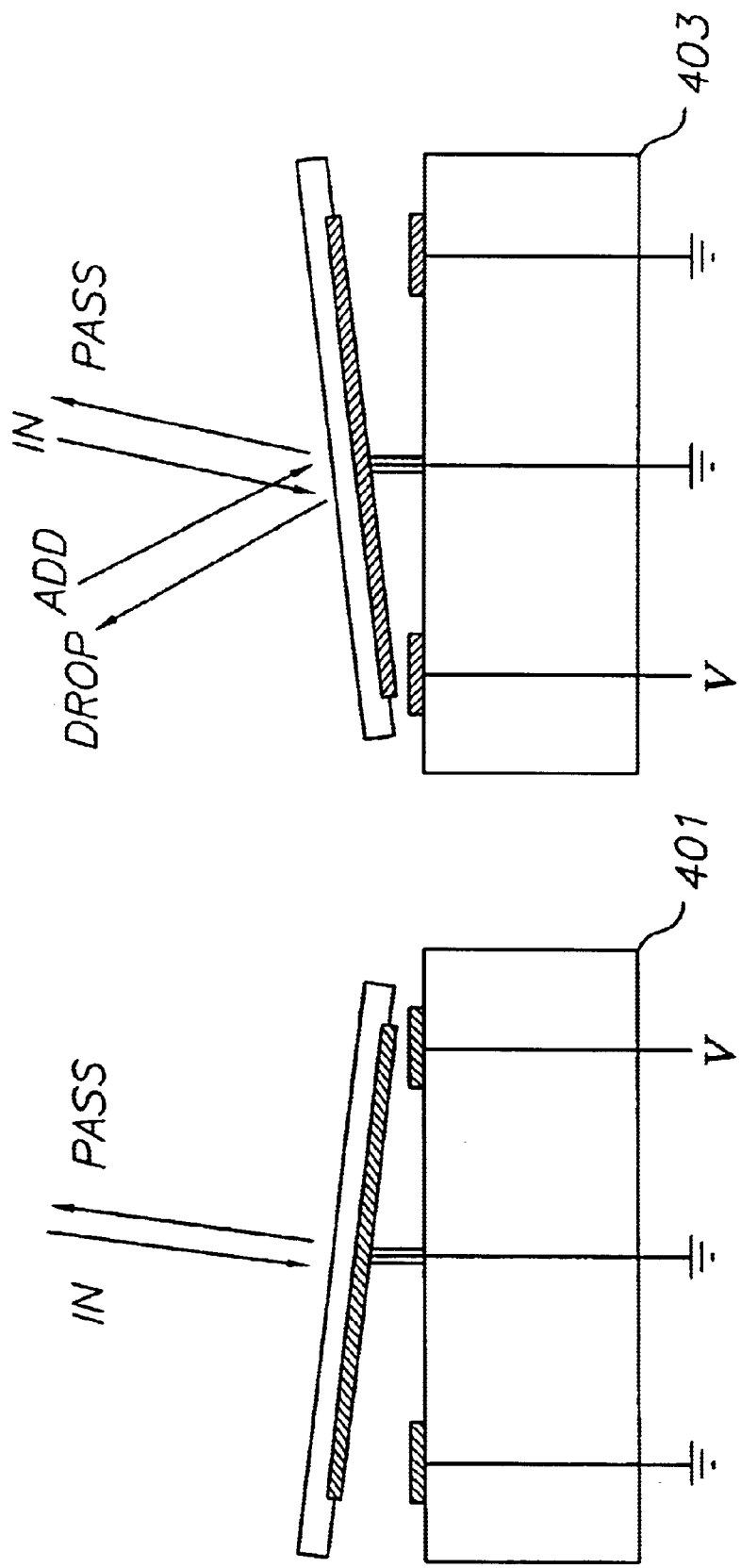
FIG. 4 is a schematic side view of a MEMS mirror in IN/PASS and DROP/ADD modes, employed in the embodiment of FIG. 3.

More specific details of the see-saw mirrors used in the FIG. 3 are provided in FIG. 4. The mirror's state detailed in 401 is as employed for IN/PASS mode. The mirror's state detailed in 403 is as employed for DROP/ADD mode. By reversing the voltage and ground applied the mirror changes its position, directing the optical signals as detailed above.

A third embodiment of the invention is detailed in FIG. 5, again by way of a four channel programmable optical add/drop multiplexer. The optical add/drop multiplexer of FIG. 5 may be dynamically programmed to demultiplex and multiplex any combination of channels onto or off the multi-channel collimated light signal.

Figure 5:
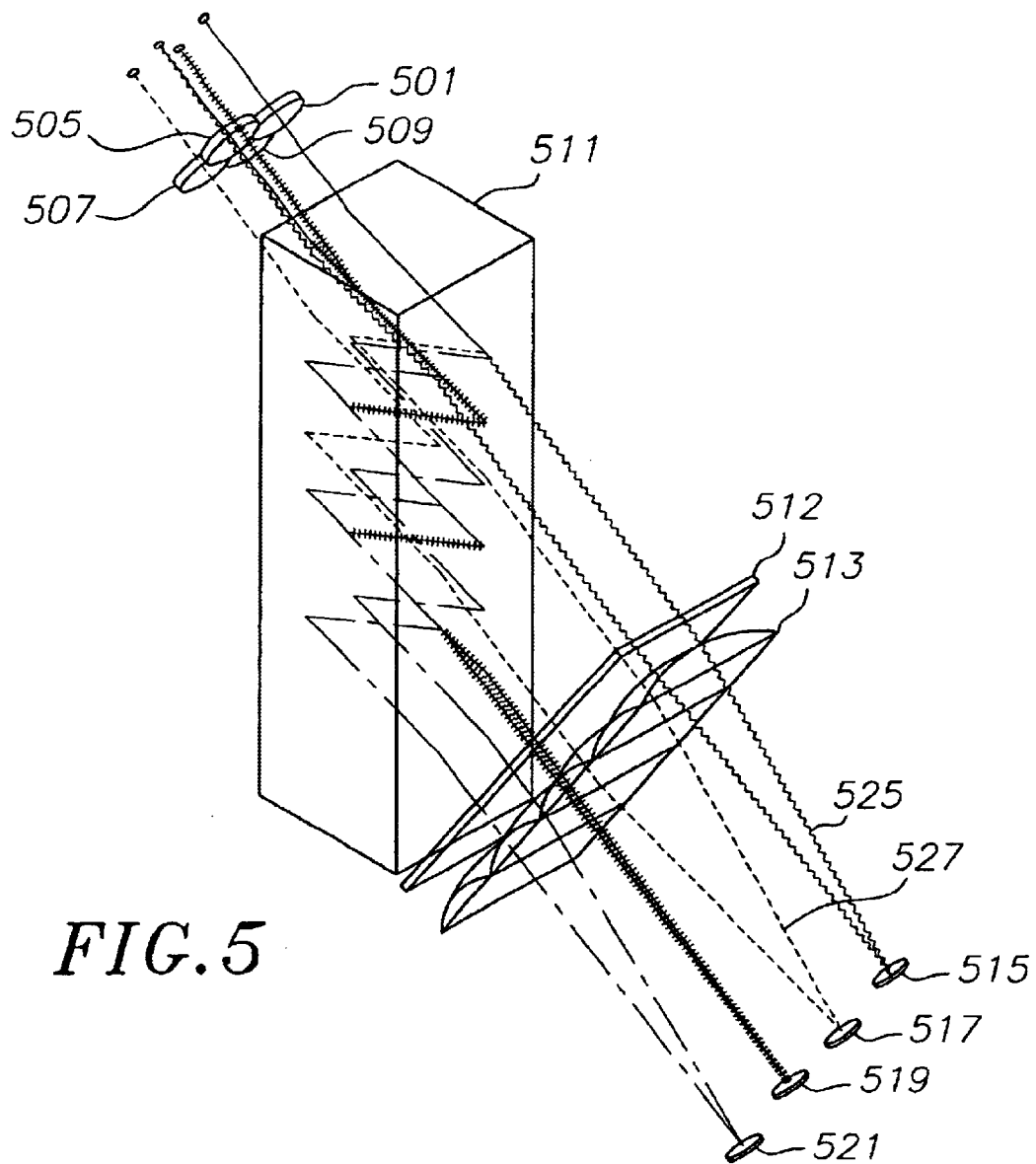
FIG. 5 is a perspective view of a third embodiment of a programmable optical add/drop multiplexer detailing the various channel paths through the device.

The programmable optical add/drop multiplexing device of FIG. 5 comprises an IN collimator 503, a PASS lens 505, a DROP lens 507, and an ADD collimator 509, a thin film demux/mux 511, a lens array 513, a first, second, third and fourth channel mirror 515, 517 519 and 521. All of these component are precisely aligned with each other, and mounted together so as to accommodate the entrance and exit of optical signals. The device of FIG. 5 may probably be mounted within an enclosure optimize for optical transmission, including a gas-filled enclosure, or the like.

In FIG. 5 a multi-channel light signal enters the device through the first collimator 503 and directed into the thin film demux/mux 511. The collimated light signal is directed inside the thin film demux/mux 511 so as to enable each channel to separately exit the thin film demux/mux 511 and be focused by the lens array 513 onto one of four see-saw mirrors 515, 517, 519, 521 corresponding to one of the four channels of the device; the first channel exits the thin film demux/mux 511 and is focused onto channel mirror 515, the second channel is focused onto channel mirror 517, the third channel is focused onto channel mirror 519, and the fourth channel is focused onto channel mirror 521. Gaussian beam waists are located mid-way through the thin film demux/mux and at the center of each of the mirrors to minimize insertion losses. For each channel, the lens array element relays the beam waist formed by the collimators in the middle of the demux/mux onto the channel mirror. Since the distance between the collimator waist and the lens array elements differs for each channel depending on the zig-zag path through the demux/mux, each area lens optimally has a different radius of curvature and conic constant. To center the waists on each of the channel mirrors different wedges for each of the four sub-apertures used by the IN, DROP, ADD, and PASS beams are employed and different wedges for each channel are also employed. The radius, conic, and wedges can be easily designed using commercially available lens design software.

It will be understood by those familiar with the art that the centered wavelength of each channel need not be demuxed or muxed beginning with the highest centered or lowest centered, nor need the channels be arranged in order of their wavelength. In fact, it will be further understood by those familiar with the art that wavelengths may be demuxed or muxed in any order.

As in the previous example, here the first and fourth channels are PASSED through the device, the second channel is DROPPED from the device, and the third is ADDED. Each of the four channel's path's are detailed below.

Channel one 525 is PASSED through the devices as follows. The multi-channel light signal 501 enters the device through the IN collimator 503 and is directed into the thin film demux/mux 511. Channel one 525 passes through the thin film filter corresponding to its wavelength, demultiplexing the channel from the multi-channel collimated light signal 501 and is directed through the lens array 513 where it is focused onto channel mirror 515.

Channel mirror 515 is in PASS mode, accordingly, channel one 525 is reflected off the channel mirror back through the lens array 513 and focused onto the thin film demux/mux 511. Channel one 525 enters the thin film demux/mux 511 and is muxed onto the multi-channel collimated light signal. Next, the multi-channel collimated light signal enters the PASS lens 505 and exits the device through the PASS port.

Channel four 531 is PASSED in identical fashion to channel one 525, except that the channel four 531 passes through the thin film filter corresponding to its wavelength and is reflected back by channel mirror 521.

Channel two 527 is DROPPED from the device as follows: The multi-channel light signal 501 enters the device through the first collimator 503 and is directed into the thin film demux/mux 511. Channel two 527 passes through the thin film filter corresponding to its wavelength, demultiplexing the channel from the multi-channel collimated light signal and is directed through the lens array 513 where it is focused onto channel mirror 517.

Channel mirror 517 is programmed to DROP/ADD the channel, and accordingly, channel two 527 is reflected off channel mirror 517 back through the lens array 513 and focused onto the thin film demux/mux 511, then enters the DROP lens 507 exits the device through the DROP port.

A new channel three 529 may be ADDED as follows: In the instance where channel mirror 519 is engaged and DROPs channel three contained within the multi-channel collimated light signal 501, a new channel three 529 may be ADDED to the multi-channel light signal exiting the device. A new channel three 529 337 enters the device through the ADD collimator 509 and is directed into the thin film demux/mux 511. The new channel three 529 passes through the thin film filter corresponding to its wavelength and is directed through the lens array 513 where it is focused onto channel mirror 519.

Channel mirror 519 is in DROP/ADD mode, and accordingly, channel three 529 is reflected off the channel mirror back through the lens array 513 and focused onto the thin film demux/mux 511. Channel three 529 enters the thin film demux/mux 511 and is muxed onto the multi-channel collimated light signal, and exits the device through the PASS collimator 505.

The quarter-wave plate (QWP) 512 reduces for polarization dependent loss (PDL) in the system. QWP 512 is located such that it is substantially normal to the propagating light beam and the retardance axis is at 45° to the light that was polarized parallel and perpendicular to the plane of incidence throughout the demux.

Figure 6B:
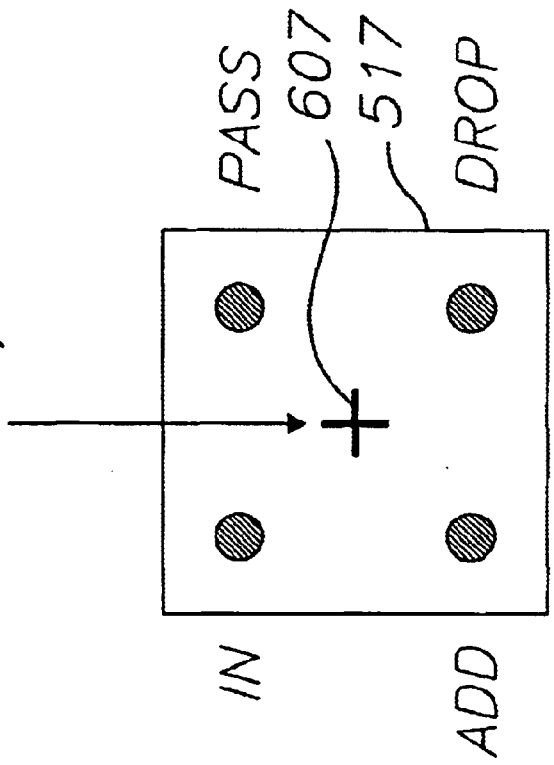
FIGS. 6A and 6B are schematic illustrations of the relationship between the mirror angle and the beams in the Optical Add/Drop Multiplexer as employed in one embodiment of the invention.
Figure 6A:
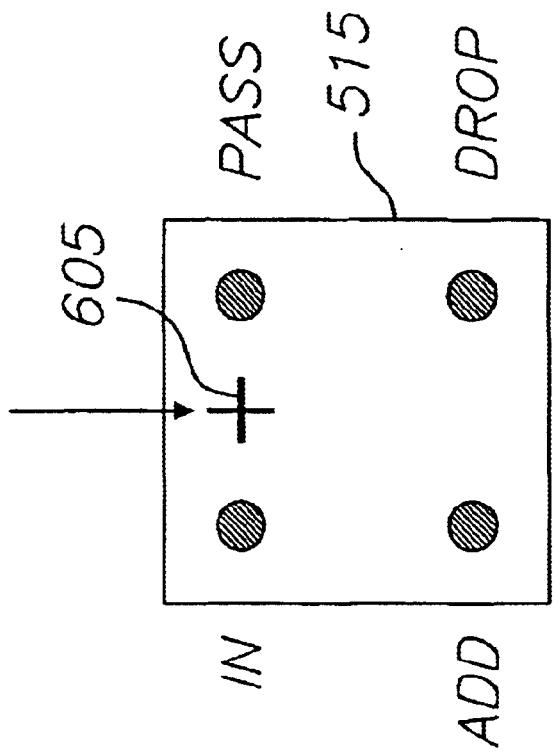

More specific details of the see-saw mirrors used in embodiment shown in FIG. 5 are provided in FIG. 6A and FIG. 6B. These two figures illustrate the angular arrangements of the beam incident on or reflected from on of the mirrors in the mirror array. To be precise, each beam 525, 527, 529, and 531 represents an angular range of a conically shaped beam. FIG. 6A shows the angular relationship between the beam and the a normal 605 (represented by a cross) of the tilting mirror 515 when in IN/PASS mode. When in IN/PASS mode the mirror normal 605 is between IN port and the PASS port so as to reflect beam 525 from the IN port to the PASS port 505.

FIG. 6B shows the angular relationship between the beam and the a normal 607 (represented by a cross) of the tilting mirror 517 when in DROP/ADD mode. When in DROP/ADD mode the mirror normal 607 is between IN and DROP, and is also between PASS and ADD. When in DROP/ADD mode, the mirror normal 607 is between the IN and the DROP so as to reflect beam 527 from the IN port to the DROP port.

A fourth embodiment of the invention is detailed in FIG. 7, again by way of a four channel programmable optical add/drop multiplexer. The optical add/drop multiplexer of FIG. 7 may be dynamically programmed to demultiplex and multiplex any combination of channels onto or off the multi-channel collimated light signal. An optical prescription for an sixteen channel programmable optical add/drop multiplexer with a silica lens array for the fourth embodiment is provided in Table 3.

TABLE 3

This embodiment is intended to operate at wavelengths near 1550 nm with a MEMS mirror that tilts +/− 0.7 deg.
COLLIMATOR
Material: SF57
Radius: −1.929
Conic: −0.667
Thickness: 1.000
The collimator array has an aspheric surface described by the following equation z = curv y^2/(1 + sqrt(1 − (1 + k)curv^2 y^2)
wherin x and y are measured from the center of each lenslet, curv = 1/ radius, and k = conic.
DEMUX/MUX BLOCK
Material: BK7
Size
Block: 1.800 × 7.608 × 14.400
Filter: 1.800 × 1.800
Tilt: 10.000 deg
LENS ARRAY
Material: SILICA
Lenslet aperture size: 1.800 × 1.773
Array size: 1.800 × 14.181

TABLE 3-continued

Substrate thickness: 2.000
Right Hand Side

| Channel | Radius | Conic | Pyramid (rad) X-tilt | Pyramid (rad) Y-tilt |
|---|---|---|---|---|
| 1 | 9.127 | −0.381 | 5.697e-003 | 5.610e-003 |
| 2 | 8.998 | −0.403 | 4.989e-003 | 4.914e-003 |
| 3 | 8.828 | −0.432 | 4.030e-003 | 3.970e-003 |
| 4 | 8.628 | −0.467 | 2.844e-003 | 2.802e-003 |
| 5 | 8.411 | −0.505 | 1.501e-003 | 1.480e-003 |
| 6 | 8.198 | −0.542 | 1.107e-004 | 1.078e-004 |
| 7 | 8.004 | −0.574 | −1.218e-003 | −1.201e-003 |
| 8 | 7.841 | −0.603 | −2.390e-003 | −2.355e-003 |

Left Hand Side

| Channel | Radius | Conic | Pyramid (rad) X-tilt | Pyramid (rad) Y-tilt |
|---|---|---|---|---|
| 1 | 9.065 | −0.391 | 5.363e-003 | 5.282e-003 |
| 2 | 8.915 | −0.417 | 4.526e-003 | 4.457e-003 |
| 3 | 8.728 | −0.449 | 3.444e-003 | 3.392e-003 |
| 4 | 8.517 | −0.487 | 2.165e-003 | 2.134e-003 |
| 5 | 8.300 | −0.525 | 7.816e-004 | 7.710e-004 |
| 6 | 8.095 | −0.559 | −5.894e-004 | −5.818e-004 |
| 7 | 7.916 | −0.589 | −1.846e-003 | −1.820e-003 |
| 8 | 7.770 | −0.614 | −2.913e-003 | −2.870e-003 |

An optical prescription for an sixteen channel programmable optical add/drop multiplexer with a silica lens array for the fourth embodiment is provided in Table 4.

TABLE 4

This embodiment is intended to operate at wavelengths near 1550 nm with a MEMS mirror that tilts +/− 0.7 deg.
COLLIMATOR
Material: SF57
Radius: −1.929
Conic: −0.667
Thickness: 1.000
The collimator array has an aspheric surface described by the following equation z = curv y^2/(1 + sqrt(1 − (1 + k)curv^2 y^2)
wherin x and y are measured from the center of each lenslet, curv = 1/ radius, and k = conic.
DEMUX/MUX BLOCK
Material: BK7
Size
Block: 1.800 × 7.608 × 14.400
Filter: 1.800 × 1.800
Tilt: 10.000 deg
LENS ARRAY
Material: SILICON
Lenslet aperture size: 1.800 × 1.773
Array size: 1.800 × 14.181
Substrate thickness: 2.000
Right Hand Side

| Channel | Radius | Conic | Pyramid (rad) X-tilt | Pyramid (rad) Y-tilt |
|---|---|---|---|---|
| 1 | 50.874 | −7.351 | 1.020e-003 | 1.005e-003 |
| 2 | 50.156 | −7.081 | 8.937e-004 | 8.800e-004 |
| 3 | 49.216 | −6.731 | 7.223e-004 | 7.111e-004 |
| 4 | 48.101 | −6.307 | 5.102e-004 | 5.021e-004 |
| 5 | 46.897 | −5.865 | 2.700e-004 | 2.654e-004 |
| 6 | 45.709 | −5.453 | 2.062e-005 | 1.951e-005 |

TABLE 4-continued

| 7 | 44.631 | −5.108 | −2.173e-004 | −2.151e-004 |
| 8 | 43.722 | −4.809 | −4.269e-004 | −4.218e-004 |

Left Hand Side

| | | Pyramid (rad) | | |
| --- | --- | --- | --- | --- |
| Channel | Radius | Conic | X-tilt | Y-tilt |
| 1 | 50.533 | −7.225 | 9.606e-004 | 9.459e-004 |
| 2 | 49.697 | −6.916 | 8.108e-004 | 7.984e-004 |
| 3 | 48.658 | −6.519 | 6.174e-004 | 6.078e-004 |
| 4 | 47.484 | −6.051 | 3.888e-004 | 3.824e-004 |
| 5 | 46.276 | −5.647 | 1.412e-004 | 1.384e-004 |
| 6 | 45.135 | −5.266 | −1.047e-004 | −1.041e-004 |
| 7 | 44.139 | −4.928 | −3.297e-004 | −3.259e-004 |
| 8 | 43.328 | −4.736 | −5.205e-004 | −5.142e-004 |

The lenslets array has an aspheric surface described by the following equation $z = (curv) \, y^2/(1 + sqrt(1 - (1 + k)curv^2 \, y^2) + xt \, abs(x) + yt \, abs(y)$
wherin x and y are measured from the center of each lenslet,
curv = 1/radius, k = conic, and xt = x-tilt and yt = y − tilt of the pyramid term.
All linear dimensions are in millimeters.

Figure 7:
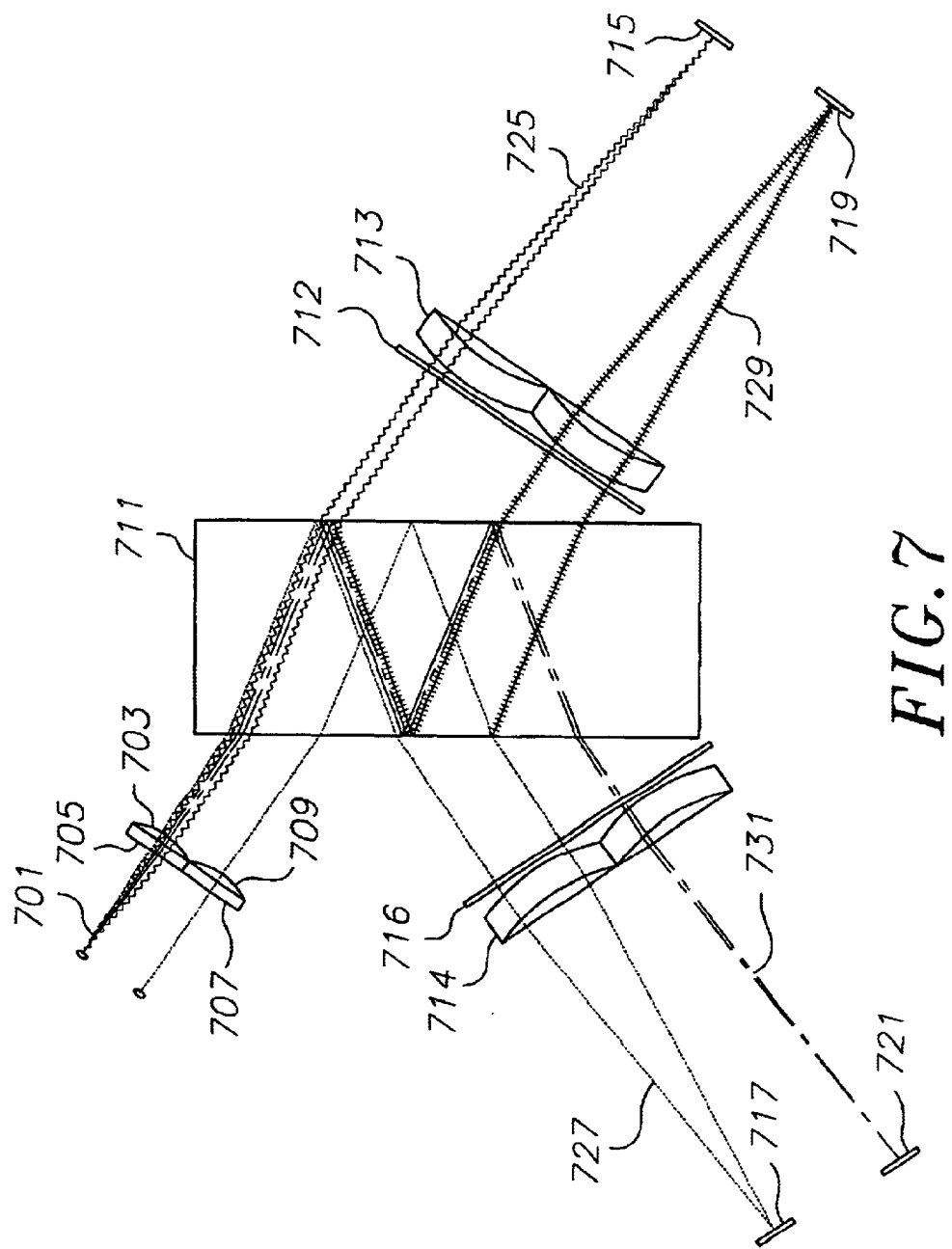
FIG. 7 is a perspective view of a fourth embodiment of a programmable optical add/drop multiplexer detailing the various channel paths through the device.

The programmable optical add/drop multiplexing device of FIG. 7 comprises an IN collimator 703, a PASS lens 705, a DROP lens 707, and an ADD collimator 709, a thin film demux/mux 711, a first lens array 713, a second lens array 716, and a first, second, third and fourth channel mirror 715, 717 719 and 721. All of these component are precisely aligned with each other, and mounted together so as to accommodate the entrance and exit of optical signals. The device of FIG. 7 may probably be mounted within an enclosure optimize for optical transmission, including a gas-filled enclosure, or the like.

In FIG. 7 a multi-channel light signal enters the device through the first collimator 703 and directed into the thin film demux/mux 711. The collimated light signal is directed inside the thin film demux/mux 711 so as to enable each channel to separately exit the thin film demux/mux 711 and be focused by either the first lens array 713 onto see-saw mirrors 715 or 717 or by the second lens array 714 onto see-saw mirrors 719 or 721 corresponding to one of the four channels of the device; the channel with the highest centered wavelength exits the thin film demux/mux 711 and is focused onto channel mirror 715, the next highest centered wavelength is focused onto channel mirror 717, the next highest centered wavelength is focused onto channel mirror 719 and the next highest centered wavelength is focused onto channel mirror 721. Gaussian beam waists are located mid-way through the thin film demux/mux and at the center of each of the mirrors to minimize insertion losses. For each channel, the lens array element relays the beam waist formed by the collimators in the middle of the demux/mux onto the channel mirror. Since the distance between the collimator waists and the lens array elements differ for each channel depending on the zig-zag path through the demux/mux, each lens element optimally has a different radius of curvature and conic constant. To center the waists on each of the channel mirrors different wedges for each of the four sub-apertures used by the IN, DROP, ADD, and PASS beams are employed and different wedges for each channel are also employed. The radius, conic, and wedges can be easily designed using commercially available lens design software.

It will be understood by those familiar with the art that wavelengths need not be demuxed or muxed beginning with the highest centered and moving toward the lowest centered. In deed, it will be further understood by those familiar with the art that wavelengths may be demuxed or muxed in any order by simply adjusting the properties of the thin film demux/mux 711.

As in the previous example, here the first and fourth channels are PASSED through the device, the second channel is DROPPED from the device, and the third is ADDED. Each of the four channels' paths is detailed below.

Channel one 725 is PASSED through the devices as follows. The multi-channel light signal 701 enters the device through the IN collimator 703 and is directed into the thin film demux/mux 711. Channel one 725 passes through the thin film filter corresponding to its wavelength, demultiplexing the channel from the multi-channel collimated light signal 701 and is directed through the first lens array 713 where it is focused onto channel mirror 715.

Channel mirror 715 is in PASS mode, accordingly, channel one 725 is reflected off the channel mirror back through the first lens array 713 and focused onto the thin film demux/mux 711. Channel one 725 enters the thin film demux/mux 711 and is muxed onto the multi-channel collimated light signal. Next, the multi-channel collimated light signal enters the PASS 705 and exits the device through the PASS port.

Channel four 731 is PASSED in identical fashion to channel one 725, except that the channel four 731 passes through the thin film filter corresponding to its wavelength, demultiplexing the channel from the multi-channel collimated light signal 701 and is directed through the second lens array 714 where it is focused onto the second channel mirror 721.

Channel two 727 is DROPPED from the device as follows: The multi-channel light signal 701 enters the device through the first collimator 703 and is directed into the thin film demux/mux 711. Channel two 729 passes through the thin film filter corresponding to its wavelength, demultiplexing the channel from the multi-channel collimated light signal and is directed through the second lens array 714 where it is focused onto channel mirror 717.

Channel mirror 717 is programmed to DROP/ADD the channel, and accordingly, channel two 727 is reflected off channel mirror 717 back through the second lens array 714 and focused onto the thin film demux/mux 711, then enters the DROP lens 707 exits the device through the DROP port.

A new channel three 729 may be ADDED as follows: In the instance where channel mirror 719 is engaged and DROPs channel three contained within the multi-channel collimated light signal 701, a new channel three 729 may be ADDED to the multi-channel collimated light signal exiting the device. A new channel three 729 337 enters the device through the ADD collimator 709 and is directed into the thin film demux/mux 711. The new channel three 729 passes through the thin film filter corresponding to its wavelength and is directed through the first lens array 713 where it is focused onto channel mirror 719.

Channel mirror 719 is in DROP/ADD mode, and accordingly, channel three 729 is reflected off the channel mirror back through the first lens array 713 and focused onto the thin film demux/mux 711. Channel three 729 enters the thin film demux/mux 711 and is muxed onto the multi-channel collimated light signal, and exits the device through the PASS lens 705. A first quarter-wave plate (QWP) 712 and a second quarter-wave plate (QWP) 716 reduce polarization dependent loss (PDL) in the system.

Figure 8:
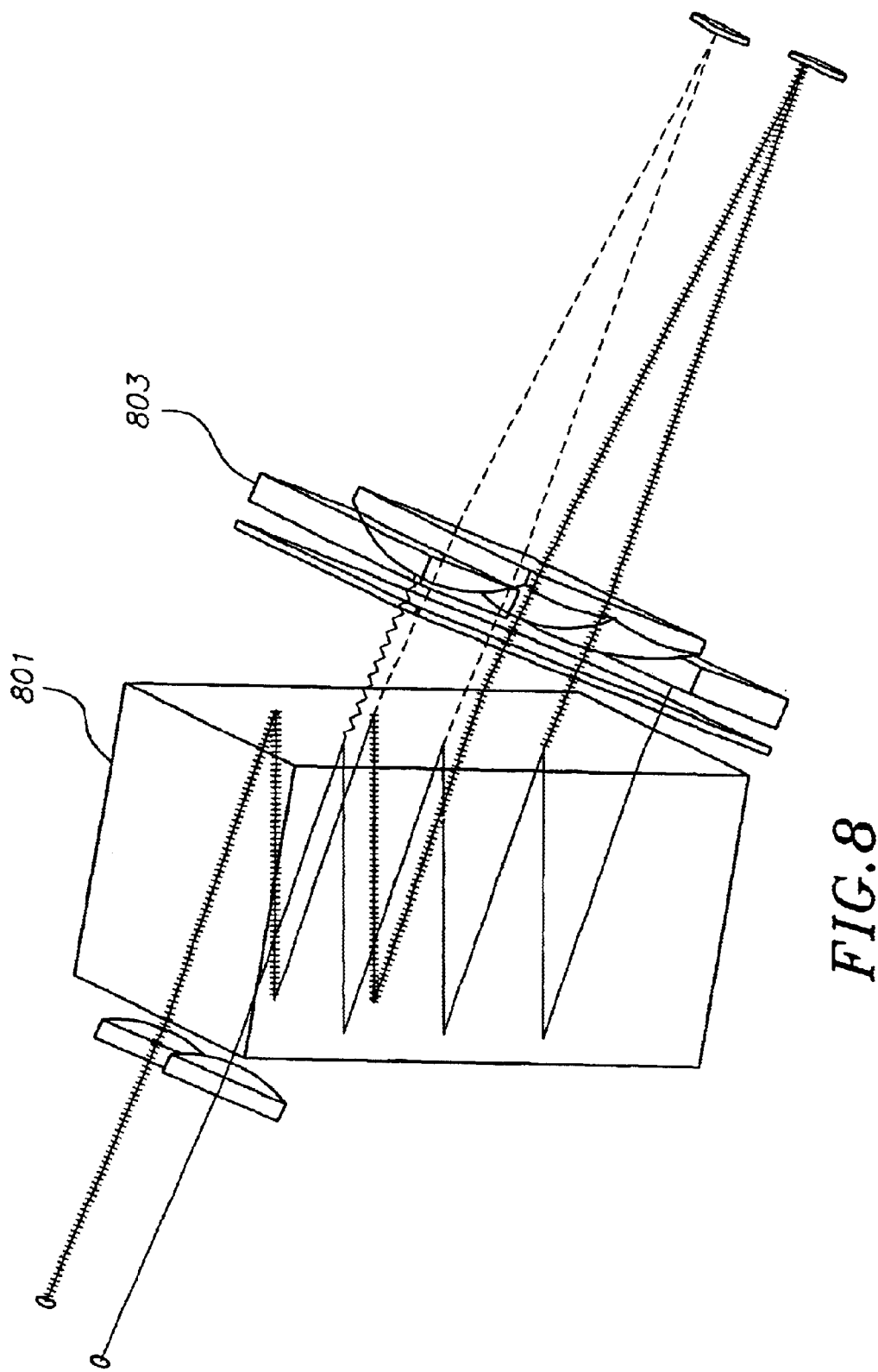
FIG. 8 is a perspective view of one embodiment of a programmable optical add/drop multiplexer and optional mirrors.

In FIG. 8 a reflective mirror 803 is employed to directly reflect a channel back into thin film demux/mux 801 for the embodiments of the invention that use circulators. The mirror 805 may also be used to reflect multiple channels back into thin film demux/mux 801 by mounting the mirror 803 at a location in the optical path corresponding with a port on thin film demux/mux 801 that is transparent to multiple channels. Mirror 805 has a reflective surface that is angled in such as way as to reflect the channels into the PASS port of the system. Alternatively, a roof mirror or prism may be used to reflect the channels into the DROP port of the system. Those skilled in the art will recognize that a reflective prism may be employed instead of a reflective mirror to achieve the same result. A prism may also be directly affixed to the thin film demux/mux 801. The reflective roof prism or roof mirror may be used to connect any pair of signals from the IN, ADD, DROP, PASS channels in the embodiments of this invention which use one demux and no circulators.

Figure 9:
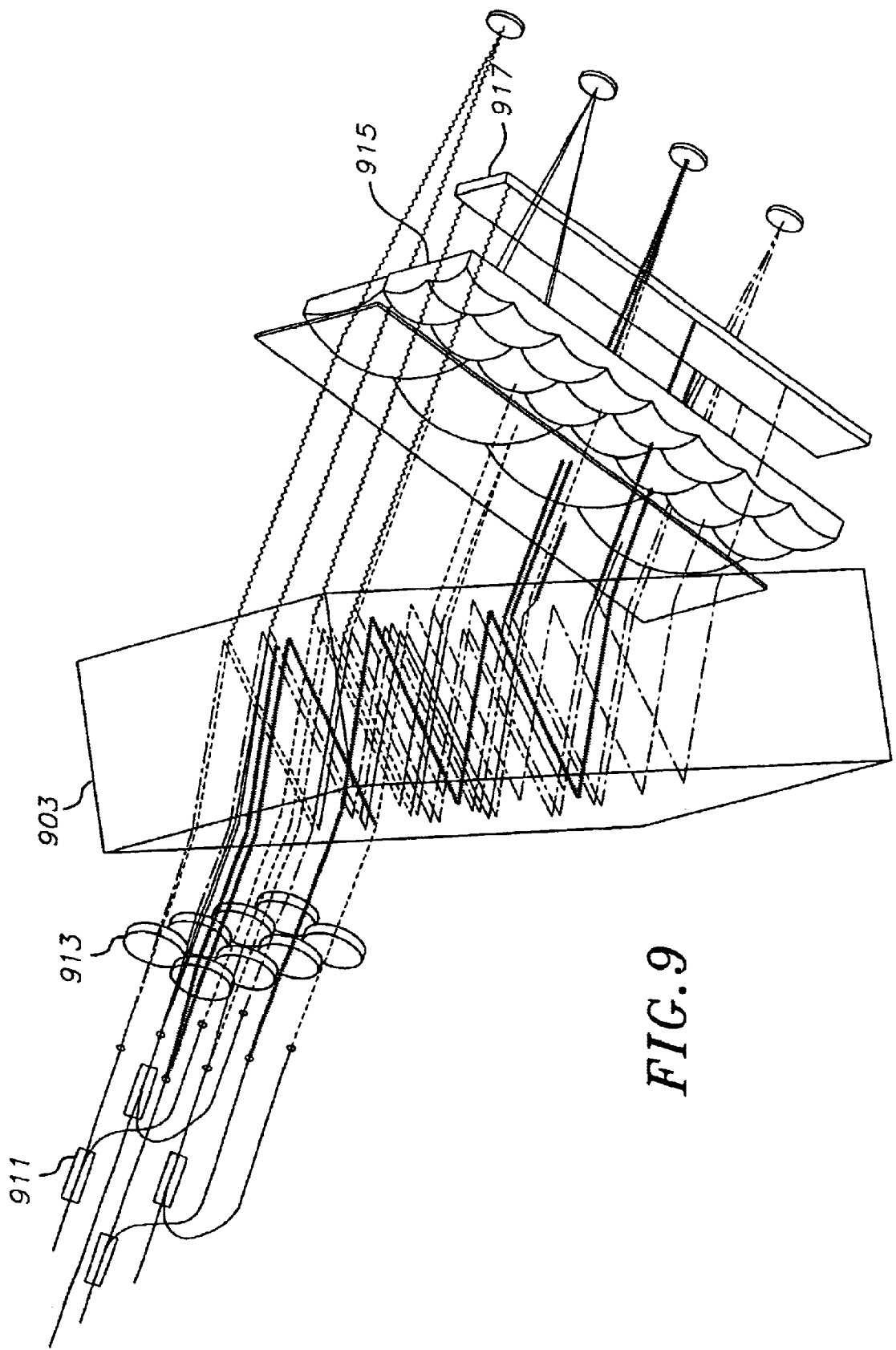
FIG. 9 is a perspective view of one embodiment of a programmable optical add/drop multiplexer and an optional detection array.

A fifth embodiment of the invention is detailed in FIG. 9, again by way of a four channel programmable optical add/drop multiplexer. The optical add/drop multiplexer of FIG. 9 may be dynamically programmed to demultiplex and multiplex any combination of channels onto or off the multi-channel collimated light signal, as well as to provide power and signal monitoring features for each of the IN, DROP, ADD, and PASS ports.

A small portion of the light split from at least one of the IN, DROP, ADD, and PASS ports using a fiber optic splitter 911 and the small portion is send to a second collimator array which contains one lens for each the IN, DROP, ADD, PASS port's that is being monitored, to the thin film demux/mux 903, to a second lens array 915, and finally to a detector array 917. Those skilled in the art will recognize that this embodiment of the invention may be practiced with any of the embodiments of the invention described herein. The second lens array 915 contains a lens for each channel of the IN, DROP, ADD, and PASS ports that is being monitored, directing the light from each channel to be directed to an individual detector located on the detector array 917.

Figure 10:
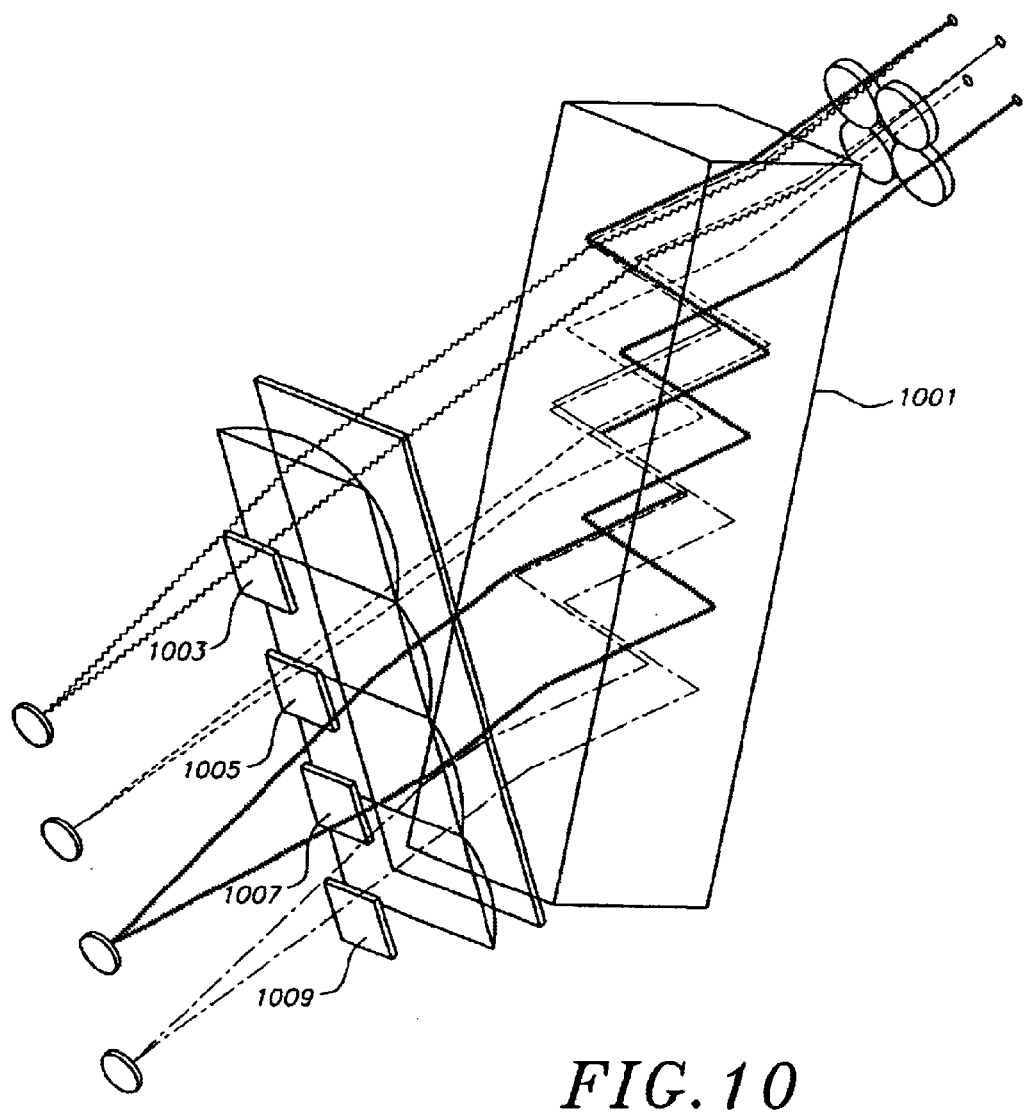
FIG. 10 is a perspective view of one embodiment of a programmable optical add/drop multiplexer and an optional optical attenuator.
Figure 11:
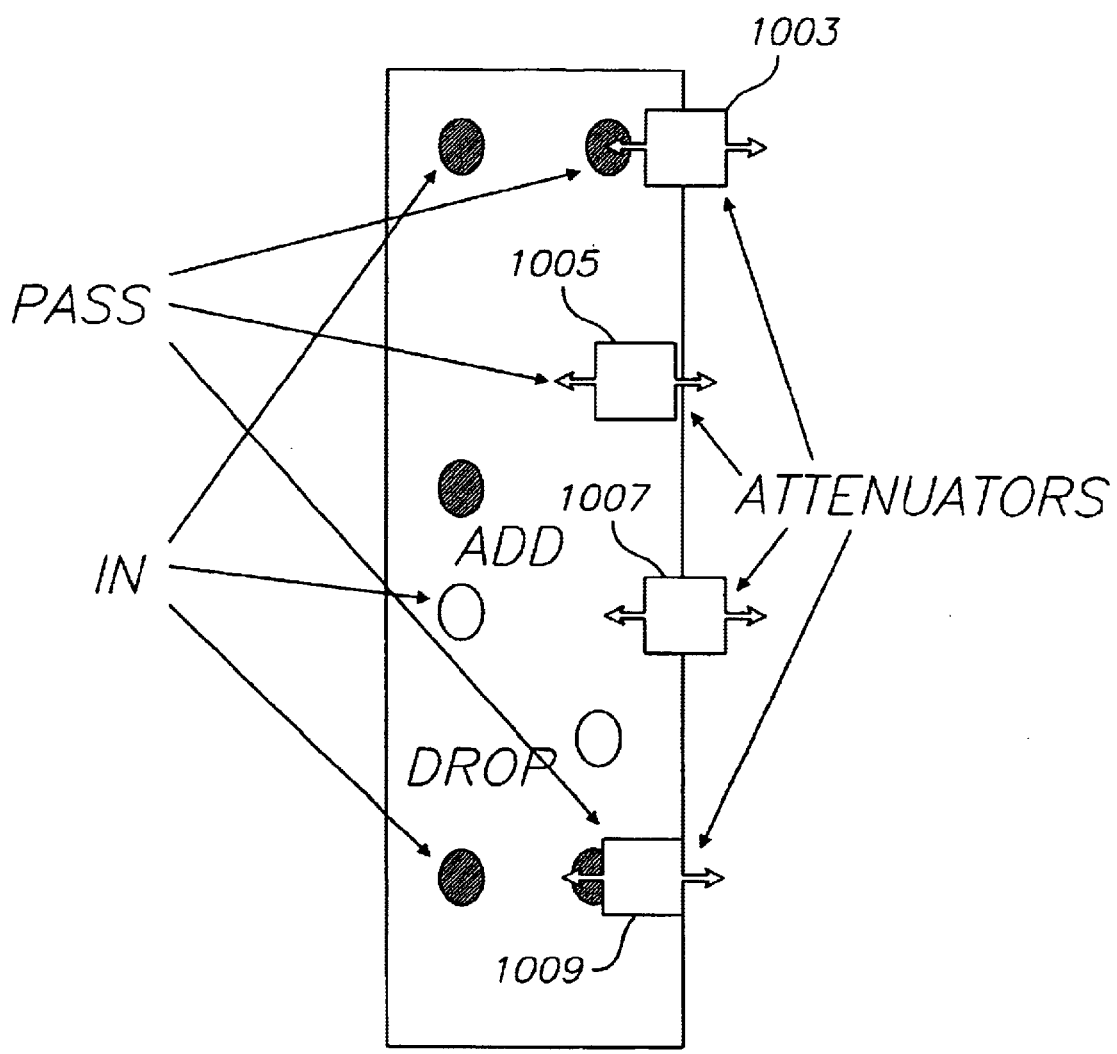
FIG. 11 is a schematic illustration of the movement of optical attenuators employed in one embodiment of the invention.

A sixth embodiment of the invention is detailed in FIG. 10, again by way of a four channel programmable optical add/drop multiplexer. Those skilled in the art will recognize that this embodiment of the invention may be practiced with any of the embodiments of the invention described herein. The optical add/drop multiplexer 1001 of FIG. 10 enables adjustable power attenuation of each of the channels by employing an array of MEMS shutters used as optical attenuators. It is also possible to place attenuators in the IN, ADD and DROP channels. Those skilled in the art will appreciate that other means of attenuating the beam are possible, including grating light valves, x liquid crystals, and interference modulators. MEMS shutters 1003, 1005, 1007, and 1009 partially obscure each of the PASS beams. A closed-loop feedback circuit each of the PASS channel may also be provided to enable automatic power control. FIG. 11 depicts the placement and movement of the MEMS shutters, when employed as optical attenuators.

Figure 12:
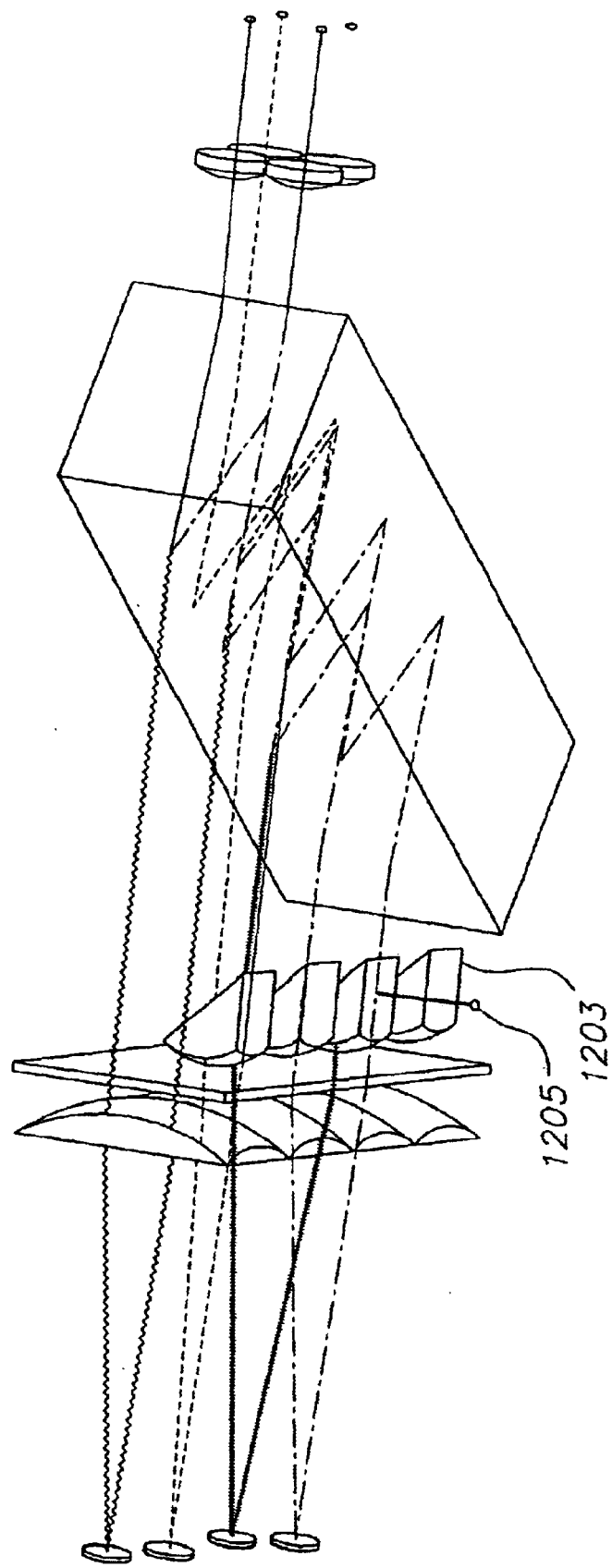
FIG. 12 is a perspective view of one embodiment of a programmable optical add/drop multiplexer and optional prisms.

A seventh embodiment of the invention is detailed in FIG. 12, again by way of a four channel programmable optical add/drop multiplexer. Those skilled in the art will recognize that this embodiment of the invention may be practiced with any of the embodiments of the invention described herein. The optical add/drop multiplexer enables the ADD channels to be introduced and the DROP channels to be removing to separate optical ports 1205. Each port contains a single wavelength, a single collimator, and optionally reflecting means such as a prism 1203 or mirror (not shown) is used to redirect the channels. Light may be introduced or removed from the single wavelength ADD and DROP ports via an optical fiber. Alternatively, the ADD ports may directly collimate a laser transmitter and the DROP ports may be focused onto a receiving detector. This embodiment may be practiced on one or more channels, and in combination with other embodiments, of a multi-channel programmable optical add/drop multiplexer. When used with the second embodiment of this invention, a circulator is needed of each of the separate ADD/DROP channels. When the sixth and seventh embodiment of this invention is practiced, it is desirable to place the attenuators between the separate ADD/DROP ports and the lenses. It is most preferred for the attenuators to be close to the ADD/DROP ports where the beams are small, which allows for smaller and faster attenuators.

What is claimed is:

1. In a multi-channel optical switching system comprising a first thin film optical demux/mux and a plurality of optical ports including an INPUT port, a first thin film optical demux/mux port optically connected to the thin film optical demux/mux, and a second thin film optical demux/mux port optically connected to the thin film optical demux/mux, an optical add/drop multiplexer comprising:

a port selector that receives light from the INPUT port and directs the light to one of the plurality of optical ports;

a user input for directing the port selector to select a particular one of the plurality of ports;

a first optical circulator optically connected to first thin film optical demux/mux port; and a second optical circulator optically connected to the second thin film optical demux/mux port.

2. In an optical system with an INPUT port, a DROP port, an ADD port, a PASS port, a first thin film optical demux/mux, an INPUT lens, a DROP lens, a first lens array, a second thin film optical demux/mux, a ADD lens, a PASS lens, a second lens array, and an array of mirrors; an optical add/drop multiplexer comprising:

the INPUT lens, positioned between the INPUT port and the first thin film optical demux/mux, collimating light from the INPUT port for the first thin film optical demux/mux;

the DROP lens, positioned between the DROP port and the first thin film optical demux/mux, focusing light from the first thin film optical demux/mux on the DROP port;

the first thin film optical demux/mux positioned between the INPUT and DROP collimators and the first lens array that demultiplexes optical channels of light from a multi-channel collimated IN light source, and multiplexes optical channels of light onto a multi-channel DROP receive;

the first lens array positioned between the first thin film optical demux/mux and the array of mirrors that focuses light between the first thin film optical demux/mux and the array of mirrors;

the array of mirrors positioned between the first lens array and second lens array that reflect light;

the second lens array positioned between the array of mirrors and the second thin film optical demux/mux that focuses light from between a second thin film optical demux/mux and the array of mirrors;

the second thin film optical demux/mux positioned between the ADD and PASS lenses and the second lens array that demultiplexes optical channels of light from a multi-channel collimated ADD light source, and multiplexes optical channels of light onto a multi-channel collimated PASS receive;

the ADD lens positioned between the second thin film optical demux/mux and the ADD port that collimates light from an optical ADD channel for the second thin film optical demux/mux;

the PASS lens positioned between the second thin film optical demux/mux and the PASS port that focuses light from the second thin film optical demux/mux on an optical PASS channel.

3. The optical add/drop multiplexer of claim 2, wherein the array of mirrors may be engaged or disengaged by automation.

4. The optical add/drop multiplexer of claim 2 wherein the array of mirrors is further comprised of mirrors that reflect two or more channels of light.

5. The optical add/drop multiplexer of claim 2, wherein the array of mirrors are further comprised of pop-up MEMS mirrors.

6. The optical add/drop multiplexer of claim 2, further including a reflective prism positioned between the second thin film optical demux/mux and the second lens array.

7. The optical add/drop multiplexer of claim 2, further including optical attenuators between the first thin film optical demux/mux and the second thin film optical demux/mux.

8. The optical add/drop multiplexer of claim 2, further including one or more optical quarter-wave plates between the first thin film optical demux/mux and the first lens array.

9. The optical add/drop multiplexer of claim 2, further including one or more optical quarter-wave plates between the second thin film optical demux/mux and the second lens array.

10. The optical add/drop multiplexer of claim 2, further including:

at least one additional lens array, at least one detecting array; and, wherein the additional lens array focuses light between the first thin film optical demux/mux and the detecting array.

11. In optical system with an INPUT port, a DROP port, an ADD port, a PASS port, an INPUT/PASS circulator, and ADD/DROP circulator, an INPUT/PASS lens, a ADD/DROP lens, a thin film optical demux/mux, a lens array, an array of mirrors, an optical add/drop multiplexer comprising:

the INPUT/PASS circulator positioned between the INPUT port and the INPUT/PASS lens circulating light between the INPUT port and the INPUT/PASS lens, and between the INPUT/PASS lens and the PASS port;

the ADD/DROP circulator positioned between the OUTPUT port and the ADD/DROP lens circulating light between the ADD port and the ADD/DROP lens, and between the ADD/DROP lens and the DROP port;

the INPUT/PASS lens positioned between INPUT/PASS circulator and the thin film optical demux/mux collimating light from the INPUT/PASS circulator for the thin optical demux/mux when light is traveling in the first direction and focusing light from the thin film optical demux/mux onto the INPUT/PASS circulator when the signal is traveling in the second direction;

the ADD/DROP lens positioned between ADD/DROP circulator and the thin film optical demux/mux focusing light from the thin film optical demux/mux to the receiving when light is traveling in first direction and collimating light from the ADD/DROP circulator for the thin film optical demux/mux in the second direction;

the thin film optical demux/mux positioned between both the INPUT/PASS lens and the ADD/DROP lens and the lens array that demultiplexes optical channels of light from a multi-channel collimated light source, and multiplexes optical channels of light onto a multi-channel collimated light source;

the lens array positioned between the thin film optical demux/mux and the array of mirrors that focuses light between the thin film optical demux/mux and the array of mirrors; and the array of mirrors that reflect light.

12. The optical add/drop multiplexer of claim 11, wherein the array of mirrors may be engaged or disengaged by automation.

13. The optical add/drop multiplexer of claim 11, further including a reflective prism positioned between the thin film optical demux/mux and the lens array.

14. The optical add/drop multiplexer of claim 11, further including optical attenuators between the thin film optical demux/mux and the array of mirrors.

15. The optical add/drop multiplexer of claim 11, further including one or more optical quarter-wave plates between the thin film optical demux/mux and the lens array.

16. The optical add/drop multiplexer of claim 11, further including:

a second lens array that focuses light between the thin film optical demux/mux and a detecting array.

17. The optical add/drop multiplexer of claim 11, further including, a second lens array focuses light between the thin film optical demux/mux and a second array of mirrors;

wherein the thin film demux/mux is further comprised of two sides that permit light to enter and exit the thin film demux/mux.

18. The optical add/drop multiplexer of claim 11, further including optical attenuators.

19. The optical add/drop multiplexer of claim 11, further including one or more optical quarter-wave plates.

20. The optical add/drop multiplexer of claim 11, further including:

at least one optical channel ports; and at least one lens and/or reflector for reflecting one of the optical channels of light directly into one of the optical channel ports.

21. In optical system with an INPUT port, a DROP port, an ADD port, a PASS port, an INPUT lens, a PASS lens, a ADD lens, a DROP lens, a thin film optical demux/mux, a lens array, an array of mirrors, an optical add/drop multiplexer comprising:

the INPUT lens positioned between INPUT port and the thin film optical demux/mux collimating light from the INPUT port for the thin film optical demux/mux;

the ADD lens positioned between ADD port and the thin film optical demux/mux collimating light from the ADD port for the first thin film optical demux/mux;

the DROP lens positioned between DROP port and the thin film optical demux/mux focusing light from the first thin film optical demux/mux onto the DROP port;

the thin film optical demux/mux positioned between the INPUT, PASS, ADD, and DROP lenses and the lens array that demultiplexes optical channels of light from a multi-channel collimated light source, and multiplexes optical channels of light onto a multi-channel collimated light source;

the lens array, positioned between the thin film optical demux/mux and the array of mirrors, focusing light between the thin film optical demux/mux and the array of mirrors; and the array of mirrors reflecting light.

22. The optical add/drop multiplexer of claim 21, wherein the array of mirrors may be engaged or disengaged by automation.

23. The optical add/drop multiplexer of claim 21, further including a reflective prism positioned between the thin film optical demux/mux and the lens array.

24. The optical add/drop multiplexer of claim 21, further including optical attenuators between the thin film optical demux/mux and the array of mirrors.

25. The optical add/drop multiplexer of claim 21, further including one or more optical quarter-wave plates between the thin film optical demux/mux and the lens array.

26. The optical add/drop multiplexer of claim 21 further including:

a second lens array that focuses light between the thin film optical demux/mux and a detecting array.

27. The optical add/drop multiplexer of claim 21, further including, a second lens array that focuses light between the thin film optical demux/mux and a second array of mirrors;

wherein the thin film demux/mux is further comprised of two sides that permit light to enter and exit the thin film demux/mux.

28. The optical add/drop multiplexer of claim 21, further including optical attenuators.

29. The optical add/drop multiplexer of claim 21, further including one or more optical quarter-wave plates.

30. The optical add/drop multiplexer of claim 21, further including:

at least one optical channel ports; and at least one lens and/or reflectors for reflecting one of the optical channels of light directly into one of the optical channel ports.

* * * * *